United States Patent
Shirota et al.

(10) Patent No.: US 7,029,109 B2
(45) Date of Patent: Apr. 18, 2006

(54) INK, INK SET, INK JET RECORDING METHOD, INK JET RECORDING APPARATUS, RECORDING UNIT AND INK CARTRIDGE

(75) Inventors: Koromo Shirota, Kanagawa (JP); Shoji Koike, Kanagawa (JP); Makoto Aoki, Kanagawa (JP); Mariko Suzuki, Kanagawa (JP); Hideki Takayama, Kanagawa (JP); Yasuhiro Nito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/218,423

(22) Filed: Aug. 15, 2002

(65) Prior Publication Data

US 2003/0109600 A1  Jun. 12, 2003

(30) Foreign Application Priority Data

Aug. 22, 2001 (JP) .............................. 2001-251482

(51) Int. Cl.
*B41J 2/01* (2006.01)
(52) U.S. Cl. ....................................... 347/100; 347/101
(58) Field of Classification Search ................ 347/100, 347/96, 95, 86, 101; 106/31.13, 31.6, 31.27; 523/160
See application file for complete search history.

(56) References Cited

U.S. PATENT DOCUMENTS

| | | | |
|---|---|---|---|
| 4,313,124 A | 1/1982 | Hara .................... 346/140 R |
| 4,345,262 A | 8/1982 | Shirato et al. .......... 346/140 R |
| 4,459,600 A | 7/1984 | Sato et al. ............. 346/140 R |
| 4,463,359 A | 7/1984 | Ayata et al. ................ 346/1.1 |
| 4,558,333 A | 12/1985 | Sugitani et al. ........ 346/140 R |
| 4,608,577 A | 8/1986 | Hori ..................... 346/140 R |
| 4,723,129 A | 2/1988 | Endo et al. .................. 346/1.1 |
| 4,740,796 A | 4/1988 | Endo et al. .................. 346/1.1 |
| 5,218,376 A | 6/1993 | Asai ........................... 346/1.1 |
| 5,221,334 A * | 6/1993 | Ma et al. .................... 347/100 |
| 5,272,201 A | 12/1993 | Ma et al. .................... 524/505 |
| 5,382,283 A * | 1/1995 | Yui et al. .................... 347/100 |
| 5,519,085 A * | 5/1996 | Ma et al. .................... 347/100 |
| 5,640,187 A * | 6/1997 | Kashiwazaki et al. ...... 347/101 |
| 5,656,071 A | 8/1997 | Kappele et al. .......... 106/31.76 |
| 5,688,311 A * | 11/1997 | Adamic ..................... 347/100 |
| 5,696,182 A | 12/1997 | Kashiwazaki et al. ...... 523/161 |
| 5,731,825 A * | 3/1998 | Danzuka et al. .............. 347/43 |
| 5,852,075 A | 12/1998 | Held .......................... 523/161 |
| 5,853,470 A | 12/1998 | Martin et al. ............. 106/31.86 |
| 5,854,331 A | 12/1998 | Ma et al. .................... 524/505 |
| 5,993,527 A * | 11/1999 | Tochihara et al. ........ 106/31.85 |
| 6,117,921 A | 9/2000 | Ma et al. .................... 523/161 |
| 6,196,671 B1 * | 3/2001 | Breemes et al. .............. 347/86 |
| 6,391,947 B1 | 5/2002 | Noguchi et al. .............. 524/84 |
| 6,538,049 B1 | 3/2003 | Kappele et al. ............ 523/161 |
| 6,702,883 B1 | 3/2004 | Sano et al. ................. 106/31.6 |

(Continued)

FOREIGN PATENT DOCUMENTS

CN 1201057 A 12/1998

(Continued)

*Primary Examiner*—Manish S. Shah
(74) *Attorney, Agent, or Firm*—Fitzpatrick, Cella, Harper & Scinto

(57) ABSTRACT

Provided is an ink which comprises an aqueous medium and a coloring material dispersed in the aqueous medium with a dispersant, where the coloring material is contained in an amount of at most 1% by weight with respect to the total weight of the ink, and the ratio (B/P ratio) of the dispersant to the coloring material is larger than 1.

8 Claims, 15 Drawing Sheets

U.S. PATENT DOCUMENTS

| | | | |
|---|---|---|---|
| 6,790,878 B1 | 9/2004 | Kurabayashi | 523/160 |
| 2003/0008938 A1* | 1/2003 | Sano et al. | 523/160 |
| 2003/0144377 A1* | 7/2003 | Sano et al. | 523/160 |

FOREIGN PATENT DOCUMENTS

| | | |
|---|---|---|
| CN | 1223276 A | 7/1999 |
| CN | 1233633 A | 11/1999 |
| EP | 0 992 551 A2 | 4/2000 |
| EP | 0992551 A1 * | 4/2000 |
| EP | 0992551 A2 * | 4/2000 |
| EP | 992551 A2 * | 4/2000 |
| EP | 1 132 441 A1 | 9/2001 |
| EP | 1 164 173 A1 | 12/2001 |
| JP | 54-56847 A | 5/1979 |
| JP | 59-123670 A | 7/1984 |
| JP | 59-138461 A | 8/1984 |
| JP | 60-71260 A | 4/1985 |
| JP | 5-179183 A | 7/1993 |
| JP | 6-136311 A | 5/1994 |
| JP | 7-53841 A | 2/1995 |
| JP | 10-87768 A | 4/1998 |
| JP | 2783647 B2 | 8/1998 |
| JP | 11-43639 A | 2/1999 |
| JP | 11-236502 A | 8/1999 |
| JP | 11-269418 A | 10/1999 |
| JP | 2001-81369 A | 3/2001 |
| JP | 2001-81387 A | 3/2001 |
| JP | 2001-179956 A | 7/2001 |
| WO | WO 01/48100 A1 | 7/2001 |

* cited by examiner

AFTER 1μs

AFTER 2μs

AFTER 3μs

AFTER 5μs

AFTER 4μs

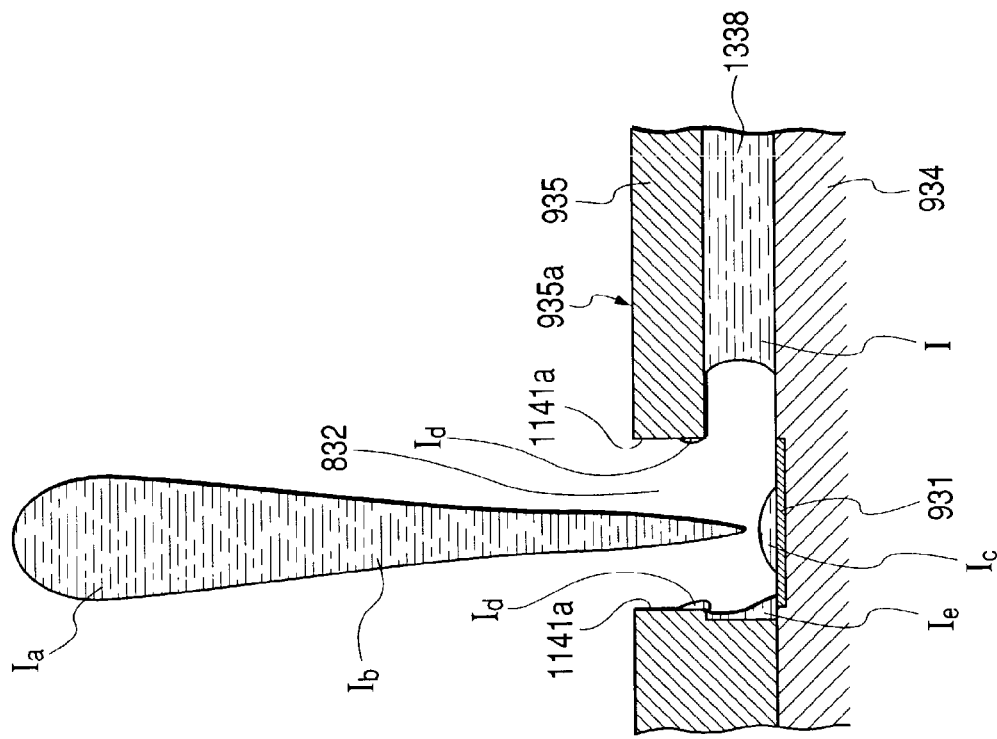
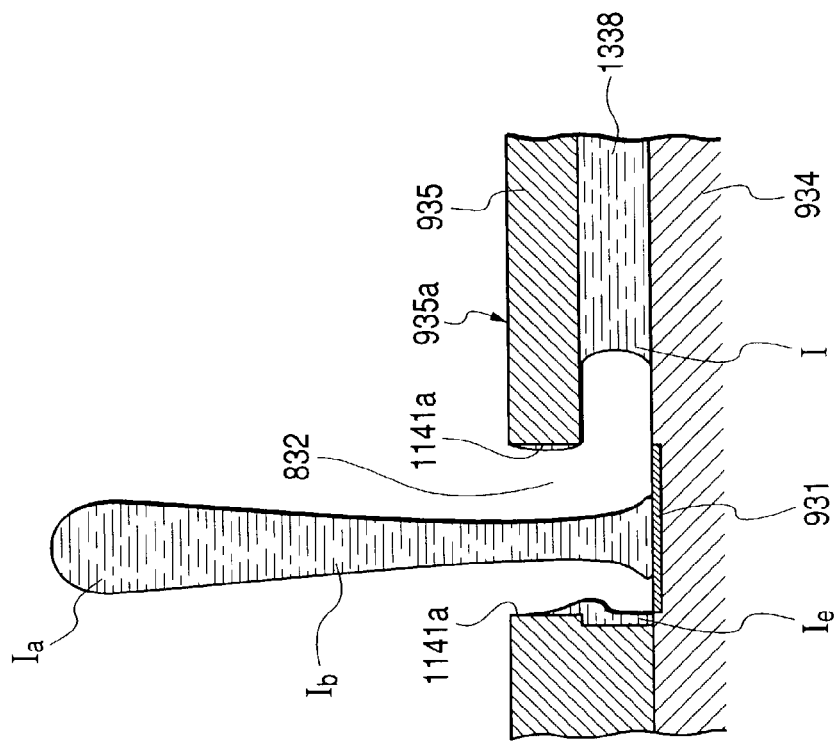

INK, INK SET, INK JET RECORDING METHOD, INK JET RECORDING APPARATUS, RECORDING UNIT AND INK CARTRIDGE

BACKGROUND OF THE INVENTION

1. Field of the Invention

The present invention relates to an ink, particularly to an ink for ink jet recording, and more particularly to an ink, an ink set, an ink jet recording method, an ink jet recording apparatus, a recording unit and an ink cartridge suitable for thermal ink jet recording system, that can provide a recorded matter with little deterioration of image quality over an prolonged time period.

2. Related Background Art

Recently, studies of ink jet ink containing pigment as a coloring material have been energetically conducted to meet the increasing need for further improved image fastness (light fastness, gas fastness, etc.).

As a result, the immediate problems of pigment ink-jet inks, i.e., nozzle clogging in the head and long-term storage instability of the ink, are considerably improved.

Meanwhile, in order to obtain high-grade photographic images by ink jet recording using ink containing a water-soluble coloring material such as a dye, there is a method to use light ink in addition to dark color inks (for example, yellow (Y) ink, cyan (C) ink, magenta (M) ink and black (Bk) ink), where light ink is an ink that forms images of the same color hue as one of the dark inks does but has a lower coloring power than the corresponding dark ink. Usually, light cyan ink and light magenta ink are used as light ink.

Also in the ink jet recording system using inks containing a water-insoluble coloring material such as pigment inks, has been investigated a combination of two inks that provide images of the same color but are different in coloring power, that is, a combination of a dark ink and a light ink. For example, WO 01/48100 discloses an ink set of a dark ink and a light ink both containing a pigment and a dispersant where the ratio (B1/P1) of the resin content (B1) to the pigment content (P1) in the dark ink is smaller than the ratio (B2/P2) of the resin content (B2) to the pigment content (P2) in the light ink and B1 and B2 are different. This provides an ink set that shows a uniform permeability of the ink and gives a high quality image with no surface roughness. Further, by setting B1 larger B2, the light fastness of the light ink can be improved to a level almost equivalent to the light fastness of the dark ink. In addition, Japanese Patent Application Laid-Open No. 2001-179956 discloses a technology for improving the roughness of the images recorded with a dark ink and a light ink both containing a pigment and a dispersant, by rendering the surface tension of the light ink lower than that of the dark ink.

SUMMARY OF THE INVENTION

As discussed above, technical information on ink jet recording using dark and light inks containing a pigment and a dispersant has been accumulated, but it is not sufficient yet. Under these circumstances, the present inventors have studied the application of dark ink and light ink containing a pigment and a dispersant to the thermal ink jet recording system. In this study, the present inventors have found that there is a tendency with a light ink in a long term discharge test that the size of an ink droplet becomes small at a low pulse (shot) number in comparison with a dark ink and distortion of ink droplet occurs, and the head life becomes short. These results were unexpected, considering that the light ink is lower in the solid content (pigment, dispersant, etc.) than the dark ink. Thus the inventors recognized these problems must be solved for achieving further higher quality of an ink jet image formed with inks containing a pigment and a dispersant and also for improving reliability of a printer loading such inks.

Thus, an object of the present invention is to provide an ink containing a water-insoluble coloring material exhibiting excellent long-term discharge properties when applied to a thermal ink jet recording system and also permitting further stabilization of ink jet recording.

Another object of the present invention is to provide an ink set effective in further stably forming a high-grade ink jet recording image.

A further object of the present invention is to provide an ink jet recording method for being capable of stably forming an ink jet recording image.

A still further object of the present invention is to provide an ink cartridge, a recording unit and an ink jet recording apparatus, suitably used for the above mentioned ink jet recording method.

According to one aspect of the present invention there is provided an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1.

According to another aspect of the present invention, there is provided an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer.

According to another aspect of the present invention, there is provided an ink set comprising a first ink and a second ink, wherein the first ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the second ink is for thermal ink jet recording, and it forms an image having the same or substantially the same hue on a recording medium as that formed with the first ink, and has higher coloring ability than that of the first ink.

According to another aspect of the present invention, there is provided an ink set comprising a first ink and a second ink, wherein;

the first ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer, and the second ink forms an image having the same or substantially the same hue on a recording medium as that formed with the first ink, and having a higher coloring ability than that of the first ink.

According to another aspect of the present invention, there is provided an ink jet recording method comprising a step of discharging an ink in response to a recording signal, where the ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1.

According to another aspect of the present invention, there is provided an ink jet recording method comprising a step of discharging an ink in response to a recording signal, where the ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer.

According to another aspect of the present invention, there is provided an ink jet recording method comprising a step of discharging at least one of a first ink and a second ink constituting an ink set using thermal energy in response to a recording signal, wherein the first ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the second ink is for thermal ink jet recording, and it forms an image having the same or substantially the same hue on a recording medium as that formed with the first ink, and has higher coloring ability than that of the first ink.

According to another aspect of the present invention, there is provided an ink jet recording method comprising a step of discharging at least one of a first ink and a second ink constituting an ink set in response to a recording signal, wherein the first ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer, and the second ink forms an image having the same or substantially the same hue on a recording medium as that formed with the first ink, and having a higher coloring ability than that of the first ink.

According to another aspect of the present invention, there is provided an ink jet recording apparatus comprising an ink container containing an ink, and a thermal ink jet head for discharging the ink, wherein the ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1.

According to another aspect of the present invention, there is provided an ink jet recording apparatus comprising an ink container containing an ink and a head for discharging the ink, wherein the ink comprises an aqueous medium and a coloring material dispersed in the aqueous medium with a dispersant, the coloring material is contained in an amount of at most 1% by weight with respect to the total weight of the ink, wherein a ratio (B/P ratio) of the dispersant to the coloring material is larger than 1, and the dispersant comprises a block copolymer.

According to another aspect of the present invention, there is provided an ink jet recording apparatus comprising ink containers containing a first ink and a second ink constituting an ink set respectively, and thermal ink jet heads for discharging the respective inks, wherein the first ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the second ink is for thermal ink jet recording, and it forms an image having the same or substantially the same hue on a recording medium as that formed with the first ink, and has higher coloring ability than that of the first ink.

According to another aspect of the present invention, there is provided an ink jet recording apparatus comprising ink containers containing a first ink and a second ink constituting an ink set and heads for discharging the respective inks wherein the first ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer, and the second ink forms an image having the same or substantially the same hue on a recording medium as that formed with the first ink, and having a higher coloring ability than that of the first ink.

According to another aspect of the present invention, there is provided an ink jet recording apparatus comprising an ink container containing each of a first ink and a second ink constituting an ink set for thermal ink jet recording, wherein the first ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer, and the second ink forms an image having the same or substantially the same hue on a recording medium as that formed with the first ink, and having a higher coloring ability than that of the first ink, and thermal ink-jet heads for discharging the respective inks.

According to another aspect of the present invention, there is provided

According to another aspect of the present invention, there is provided

According to another aspect of the present invention, there is provided a recording unit comprising an ink container containing an ink and an ink jet head for discharging the ink, wherein the ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, or the ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer.

According to another aspect of the present invention, there is provided an ink cartridge comprising an ink containing part containing an ink, wherein the ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, or the ink is an ink comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and the dispersant comprises a block copolymer.

BRIEF DESCRIPTION OF THE DRAWINGS

FIG. 20 corresponds to the 14—14 perspective sectional shape in FIG. 13 and is a schematic sectional view for describing the change in liquid discharging action of the liquid discharging head with time as in FIGS. 14, 15, 16, 17, 18, 19 and 21;

FIG. 21 corresponds to the 14—14 perspective sectional shape in FIG. 13 and is a schematic sectional view for describing the change in liquid discharging action of the liquid discharging head with time as in FIGS. 14, 15, 16, 17, 18, 19 and 20;

DESCRIPTION OF THE PREFERRED EMBODIMENTS

Figure 1:
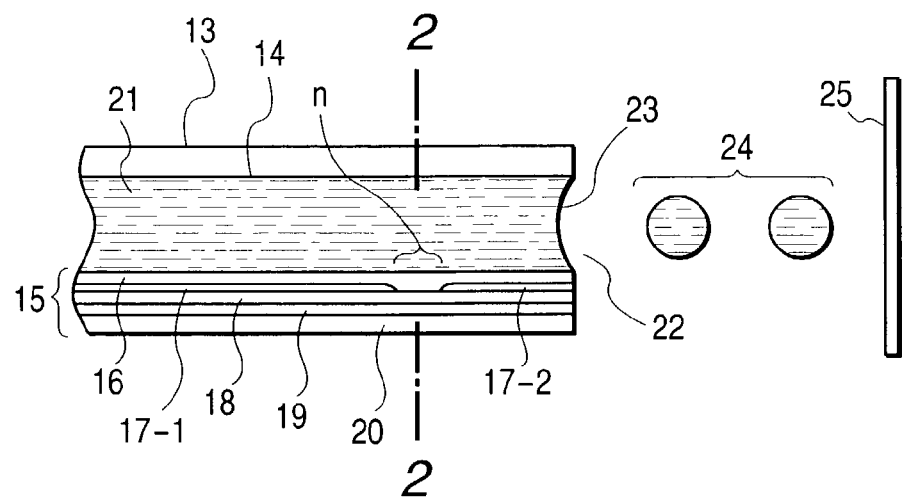
FIG. 1 is a longitudinal section of the head of an ink jet recording apparatus.

The present invention will be set forth in detail below.

First, as described above, an ink according to the present invention comprises an aqueous medium and a coloring material dispersed in the water-based medium by the action of a dispersant, characterized in that the concentration of the coloring material is 1% by weight or less of the total amount of the ink, and the ratio (B/P ratio) of the dispersant to the coloring material is larger than 1.

By adopting such constitution, the problem of a light pigment ink in the thermal ink jet recording system, i.e. the change in the droplet size with time will appear faster than the dark ink.

Although the reason why the constitution of the present invention can solve this problem is not clear, the present inventors considered on the basis of their studies on the above mentioned problem that when the B/P ratio in a light ink is almost equal to that of a dark ink, the absolute amount of the dispersant present in the light ink is small so that the dispersion state of the coloring material readily would become unstable, in particular, in the vicinity of the heater of a thermal ink jet head. To improve this dispersion instability, the inventors added the dispersant to a light ink in an amount that exceeds the amount of the pigment, although the B/P ratio of 1 was regarded as the maximum value. As a result, change in the droplet size with time and distortion of the droplets were improved. This experimental result supports the above presumption. Further, when the B/P ratio is more preferably 1.2 or larger and still more preferably 1.5 or larger in the present invention, significant improvement is achieved in the change of the droplet size and distortion of the droplets.

The effect of the ink of the present invention is more significant when a head with a liquid droplet amount of 40 pl or less, more preferably 20 pl or less, or particularly preferably 10 pl or less, is employed.

In addition, as a secondary effect of the present invention, there is improvement in light fastness of an image formed with a light ink. In general, particles of the color pigment for ink jet recording are small in size in comparison with pigments used for screen printing, etc., around 200 nm or less, and particularly recently, mostly about 100 nm. Color pigments are preferably used in fields of large posters or photographs requiring long-term display so that printed on a recording medium called coated paper or glossy paper having certain treated surface. On such a recording medium, the pigment particles in ink are not absorbed into the recording medium and remain on the surface. Accordingly, the pigment particles are directly exposed to light, so that even pigments generally considered to have high light fastness may also be faded after long-term irradiation. In particular, light inks are subject to fading because the amount of pigment on the paper surface is small.

In the present invention, by increases the ratio of a dispersant to a pigment in a light ink, the light fastness is improved significantly. This seems to be because fading by light is related to the presence of oxygen and the dispersant on the paper surface covers the pigment to shut off from the air, whereby preventing light fading.

Incidentally, an ink jet ink containing 1% or less coloring material in the ink is often used in combination with an ink (dark ink) of the same color hue but of a higher coloring power so as to form an ink jet image at a level of silver halide photography where the dots are inconspicuous and gradation is extremely smooth. However, the ink of the invention is not necessarily used in combination with a dark ink, but can of course be used alone. However, for the sake of convenience, an ink with a concentration of coloring material of 1% by weight or less relative to the total ink amount is referred to as a "light ink" herein.

In the ink of the present invention, the concentration of a coloring material is 1% by weight or less, preferably 0.9% by weight or less, and more preferably 0.8% by weight or less in view of the aim of the light ink that the edge of each dot should not be seen, although it may vary depending on the kind of coloring material and also on the proportion to the concentration in the dark ink, etc when the inks are used as an ink set. On the other hand, the lower limit of the pigment concentration is 0.1% by weight or more with respect to the total amount of the ink, preferably 0.2% by weight or more and further preferably 0.3% by weight or more in order for the coloring power not to become too low.

(Pigments)

Pigments used for light inks relating to the present invention will be described hereinafter.

Pigments used for black inks include, for example, Carbon Black.

Examples of color pigments include, when indicated by color index numbers, C.I. Pigment Yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, and 185, and C.I. Pigment Orange 16, 36, 43, 51, 55, 59, 61, and 71, and C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, and 272, and C.I. Pigment Violet 19, 23, 29, 30, 37, 40, and 50, and C.I. Pigment Blue 15, 15:1, 15:3, 15:4, 15:6, 22, 60, and 64, and C.I. Pigment Green 7 and 36, and C.I. Pigment Brown 23, 25, and 26.

Of these, use of cyan and magenta pigments remarkably shows the effect of the present invention. In particular, use of at least one selected from the group consisting of C.I. Pigment Red 122 of magenta pigments, C.I. Pigment Blue 15:3 and C.I. Pigment Blue 15:4 of cyan pigments gives preferable color and balance of light fastness between a dark ink and a light ink.

In addition, while the particle size of a pigment to be used is not limited, it is preferably 200 nm or larger.

Now, in the present invention, a pigment of a self-dispersion type and thus a pigment wherein hydrophilic groups thereof are directly, or through other atomic groups, bonded chemically to the pigment surfaces can be freely used as a coloring material in combination with a pigment that can be dispersed in an aqueous medium by the action of a dispersant.

(Dispersants)

Next, a dispersant for a pigment in an ink, an important feature of the present invention, will be set forth.

Examples of dispersants to be used include, for example, a water-soluble resin which is generally used as a pigment dispersant for an ink for ink jet and which contains hydrophilic and hydrophobic portions. Examples of water-soluble resins include a block copolymer and a random copolymer prepared from at least one hydrophilic monomer and at least one hydrophobic monomer and salts thereof. Example of the hydrophilic monomer include aliphatic alcoholic esters of $\alpha$, $\beta$-ethylene unsaturated carboxylic acids, acrylic acid, acrylic acid derivatives, maleic acid, maleic acid derivatives, itaconic acid, itaconic acid derivatives, fumaric acid, fumaric acid derivatives, etc. Examples of the hydrophobic monomer include styrene, styrene derivatives, vinylnaphthalene derivatives.

Polymers include block polymers and random polymers, branched polymers, and graft polymers. Of them, dispersants are particularly preferably block polymers. In other words, thermal ink jet recording includes a step of heating an ink using a heater, and so a water-soluble resin to be contained in an ink is preferably a resin that does not or rarely form koga or the like on the heater. For this reason, block polymers are particularly suited for this purpose.

The structures of block polymers include AB, BAB and ABC types (A, B, C schematically indicate polymer blocks whose structures are different to each other) and the structure is not particularly limited if block portions are present. In particular, preferably, the block polymer has hydrophobic and hydrophilic blocks as well as a balanced block size that contributes to dispersion stability, because functional groups can be introduced into the hydrophobic blocks to which the coloring material binds to enhance specific interaction between the dispersant and the coloring material for improved dispersion stability. Further, the polymer is rheologically more preferable when used in a method of utilizing thermal energy, particularly with a head corresponding to small droplet discharge.

The amount of a polymer depends on the structure of a polymer to be used, the molecular weight and other properties, and also components of the ink composition.

When the number average molecular weight of a polymer used in the present invention is 2000 or larger and less than 40000, preferably 2000 or larger and less than 20000, and particularly preferably 2000 or larger and less than 10000, even when a head using thermal energy is particularly employed, dispersion stability can be ensured without deteriorating the response at a high frequency.

In addition, methods of manufacturing these polymers are disclosed in Japanese Patent Application Laid-Open Nos. 05-179183, 06-136311, 07-053841, 10-87768, 11-043639, 11-236502, and 11-269418.

Examples of hydrophobic monomers that can be used for block copolymers include methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxylethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tryl methacrylate, sorvyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate, acrylonitrile, 2-trimethylsiloxyethyl acrylate, glycidyl acrylate, p-tryl acrylate, sorvyl acrylate, benzyl acrylate, benzyl methacrylate, and 2-phenylethyl methacrylate, but the hydrophobic monomers are not limited to these species.

Hydrophobic monomers are preferably homopolymers and copolymers of methyl methacrylate, butyl methacrylate, 2-ethylhexyl methacrylate, benzyl methacrylate, 2-phenylethyl methacrylate and benzyl acrylate, and copolymers of methyl methacrylate and butyl methacrylate.

In addition, hydrophilic monomers that can be used for block copolymers include, for example, methacrylic acid (MAA), acrylic acid, dimethylaminoethyl methacrylate (DMAEMA), diethylaminoethyl methacrylate, tertiary-butylaminoethyl methacrylate, dimethylaminoethyl acrylate, diethylaminoethyl acrylate, dimethylaminopropyl methacrylate, methacryl amide, acryl amide, and dimethylacryl amide, but the hydrophilic monomers are not limited to these compounds.

Hydrophilic monomers are preferably homopolymers and copolymers of methacrylic acid, acrylic acid, and dimethylaminoethyl methacrylate.

Polymers containing acids are directly manufactured or manufactured from blocked monomers having blocking groups removed after polymerization. Examples of blocked monomers that generate acrylic acid or methacrylic acid after removal of blocking groups include trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropiranyl acrylate and 2-tetrahydropiranyl methacrylate.

In particular, when a head using thermal energy is driven at a high frequency, the use of these block polymers for inks of the present invention improves discharge properties more conspicuously.

In addition, a head by means of thermal energy gives further discharge continuity, and so a nonionic surfactant is preferably added to an ink of the present invention. Nonionic surfactants preferably include polyoxyethylenealkyl ether, polyoxyethylenealkylphenyl ether, polyoxyethylene fatty ester, sorbitan fatty ester, polyoxyethylene sorbitan fatty ester and ethylene oxide adducts of acetylene glycol. The HLB is preferably 10 or more, more preferably 12 or more, and still more preferably 15 or more. The amount of surfactants to be used is preferably 0.3% by weight or more with respect to the total amount of ink, more preferably 0.5% by weight or more, and still more preferably 0.8% by weight or more, to sufficiently obtain the effect of discharge continuity. Furthermore, when the viscosity of the ink is taken into account, the amount of surfactants is preferably 3% by weight or less with respect to the total amount of ink more preferably 2.5% by weight or less, and still more preferably 2.0% by weight or less.

(Water-Based Medium)

Water-based media in light inks of the present invention refer to water or mixtures of water and water-soluble organic solvents.

Examples of water-soluble organic solvents include alkyl alcohols with carbon numbers of 1 to 5 such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides such as dimethyl formamide and dimethyl acetamide; ketones and ketoalcohols such as acetone and diacetone alcohol; ethers such as tetrahydrofuran and dioxane; oxyethylene and oxypropylene copolymers such as diethylene glycol, triethylene glycol, tetraethylene glycol, dipropylene glycol, tripropylene glycol, polyethylene glycol, and polypropylene glycol; alkylene glycols containing alkylene groups with 2 to 6 carbon atoms such as ethylene glycol, propylene glycol, trimethylene glycol, triethylene glycol, 1, 2, 6-hexane triol; glycerine; lower alkyl ethers such as ethylene glycol monomethyl (or ethyl) ether, diethylene glycol monomethyl (or ethyl) ether, and triethylene glycol monomethyl (or ethyl) ether; lower dialkyl ethers of polyalcohols such as triethylene glycol dimethyl (or ethyl) ether and tetraethylene glycol dimethyl (or ethyl) ether; alkanol amines such as monoethanol amines, diethanol amines and triethanol amines; and sulfolane, N-methyl-2-pyrrolidone, 2-pyrrolidone, and 1,3-dimethyl-2-imidazolidinone.

Of these solvents, ethylene glycol, diethylene glycol, triethylene glycol, 2-pyrrolidone, glycerine, and 1, 2, 6-hexane triol are preferably used.

The content of water-soluble organic solvents in a water-based ink of the present invention is not particularly limited; however, the content is preferably 3% by weight or more in relation to the total amount of ink, and is preferably 50% by weight or less.

In addition, the content of water in a light ink is preferably 50% by weight or more with respect to the total amount of ink, and is preferably 95% by weight or less.

Also, the light ink preferably contains urea and ethylene urea or trimethylolpropane as humectants similar to solvents. In particular, ethylene urea and trimethylolpropane are very suited to the present invention. These contents are preferably 1% by weight or more relative to the total weight of ink, and are preferably 20% by weight or less.

(Ink Set)

Now, an ink set relating to the present invention will be set forth.

An ink set of the present invention comprises a first ink and a second ink, where the first ink is the above-mentioned light ink according to the present invention. The second ink forms an image of the same or substantially the same color hue as the first ink forms but has a higher coloring power than the first ink. In the present invention, the second (dark) ink and the first (light) ink are defined to give images of the same hue. Here, the same color hue image means that when images of 360 dpi (dot per inch)×720 dpi on plain paper are formed with the dark ink and the light ink respectively using an ink jet recording head that ejects 20 to 50 pl droplets, and thus obtained images are visually observed and are classified into 10 Munsell categories (R, YR, Y, GY, G, BG, B, PB, P and RP) based on the Munsell color chart, and the images belong to the same category or adjacent categories.

Additionally, a higher coloring ability means that, for example, the content of a coloring material is larger than that of the first ink, that is to say, that the content of the coloring material is larger than 1% with respect to the total amount of ink. Moreover, the kinds of coloring materials are not necessarily the same between the first ink and the second ink.

The first ink, i.e. a light ink, has already been described.

With the second ink, i.e. a dark ink, suitable components and composition such as pigment, resinous dispersant and an aqueous medium are the same as those described for the light ink, except for pigment concentration and the ratio of the dispersant to the pigment.

The ratio of a resinous dispersant to a pigment in a dark ink is preferably smaller than the ratio of a dispersant to a pigment in a light ink. The weight ratio of a dispersant to a pigment (dispersant/pigment) is not particularly limited, but for long-term storage stability of an ink, the ratio is preferably 1/10 or more, more preferably 1/8 or more, and still more preferably 1/6 or more. In addition, for low viscosity and excellent discharge properties of the ink, the ratio is preferably 1 or less, more preferably 4/5 or less, and still more preferably 2/3 or less.

In addition, in an ink set of the present invention, although different pigments can be used for a dark ink and a light ink, preferably, the same pigment is used and only its amount in inks is changed.

To express a color gradation with a light ink and a dark ink using the same pigment, the pigment content of the dark ink is preferably 1.5% by weight or more for a sufficient image concentration. Pigment content of 6% by weight or less is preferable since the solid matter in the ink is not so high that clogging hardly occurs. Ink Jet Recording Apparatus, Recording Unit, etc.

A preferable apparatus, as an ink-jet recording apparatus to carry out recording by use of an ink of the present invention, is such that gives thermal energy to the ink in a recording head corresponding to recording signals, and generates liquid droplets by thermal energy.

Figure 2:
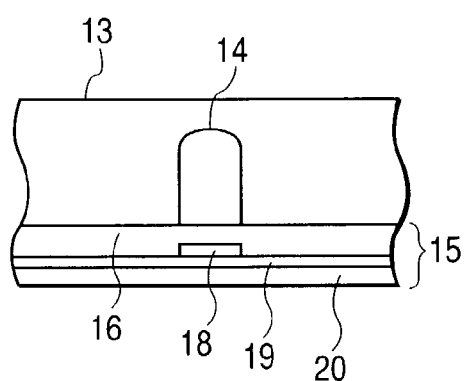
FIG. 2 is a cross-sectional view of the head of an ink jet recording apparatus.
Figure 3:
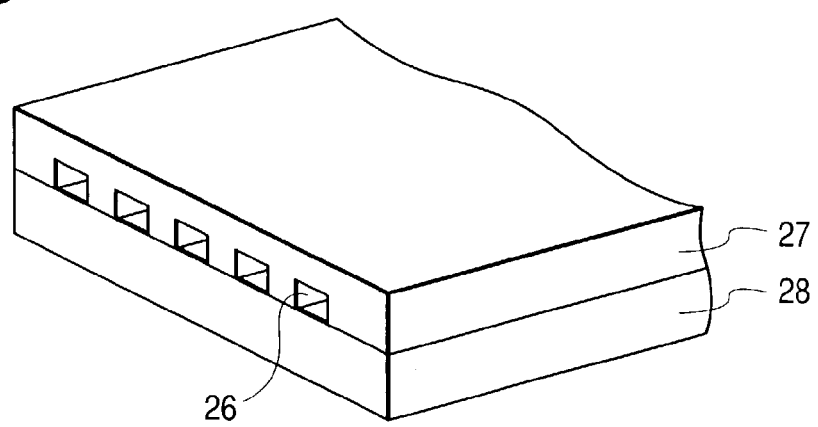
FIG. 3 is a perspective view of a head comprised of several heads as shown in FIG. 1.

Examples of the construction of a head, which is a main component of such an apparatus, are illustrated in FIGS. 1, 2 and 3. FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon or plastic plate or the like having a groove 14 through which an ink is passed, to a heating head 15 for thermal recording (not limited to such a thin-film head as illustrated by the drawings). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating properties.

An ink 21 comes up to an ejection orifice (a minute opening) 22 and forms a meniscus 23 due to a pressure P. Now, upon application of electric signals to the aluminum electrodes 17-1 and 17-2, the heating head 15 rapidly generates heat at the region shown by "n" to form bubbles in the ink 21 which is in contact with this region. The meniscus 23 of the ink is projected by the pressure thus produced, and the ink 21 is ejected in the form of ink droplets 24 from the ejection orifice 22 toward a recording medium 25.

FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
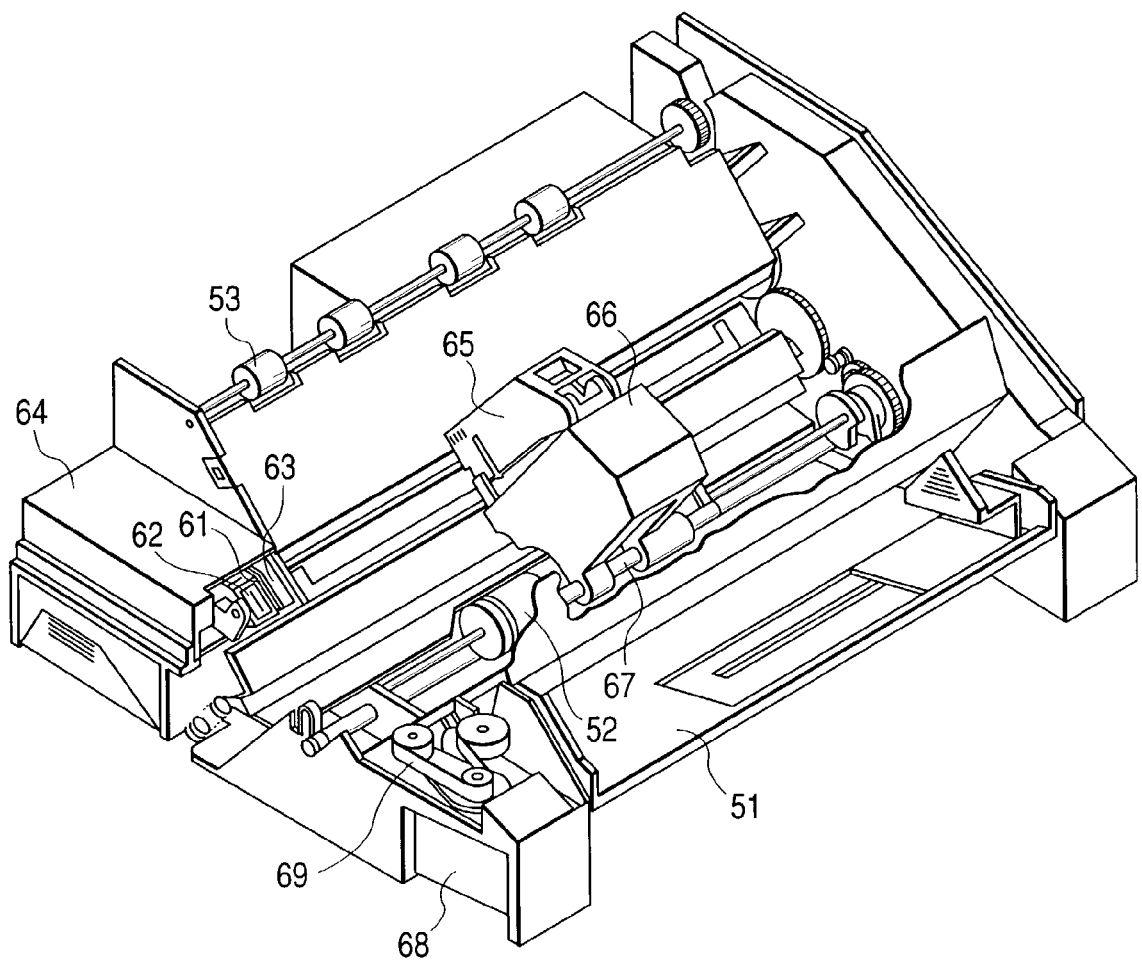
FIG. 4 is a perspective view of an example of an ink jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for the face of ejection openings of the recording head 65, which is provided at a home position adjacent to the blade 61, and is so constructed that it moves in the direction perpendicular to a direction in which the recording head 65 is moved, and comes into contact with the face of ejection openings to cap it. Reference numeral 63 denotes an ink absorbing member provided adjoiningly to the blade 61 and, similarly to the blade 61, held in such a form that it protrudes into the course through which the recording head 65 is moved.

The above-described blade 61, cap 62 and ink absorbing member 63 constitute an ejection-recovery portion 64, where the blade 61 and the ink absorbing member 63 remove water, dust and/or the like from the face of the ink-ejecting openings. Reference numeral 65 designates the recording head having an ejection-energy-generating means and serving to eject ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. By this construction, the recording medium is fed to the position opposing to the ejection opening face of the recording head 65 and delivered to the delivery portion provided with the delivery roller 53 as recording progresses.

In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also during the period when the recording head 65 is moved between recording regions for the purpose of recording, where it is moved to the home position adjacent to each recording region at given intervals, whereby the ejection opening face is wiped in accordance with this movement.

Figure 5:
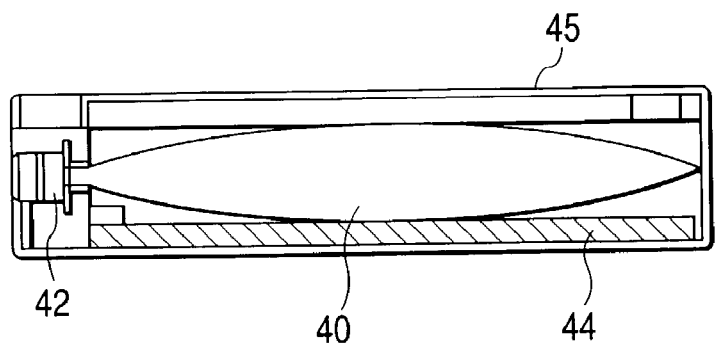
FIG. 5 is a longitudinal section of an ink cartridge.

FIG. 5 illustrates an exemplary ink cartridge 45 in which an ink to be fed to a head through a member for feeding the ink, for example, a tube is contained. Here, reference numeral 40 designates an ink container containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink. The ink container in the present invention is formed from a compound selected from the group consisting of polyadetates and polyolefines. It is preferred that the ink container 40 be formed of a polyolefin, in particular, polypropylene, at its surface with which the ink comes into contact.

Figure 6:
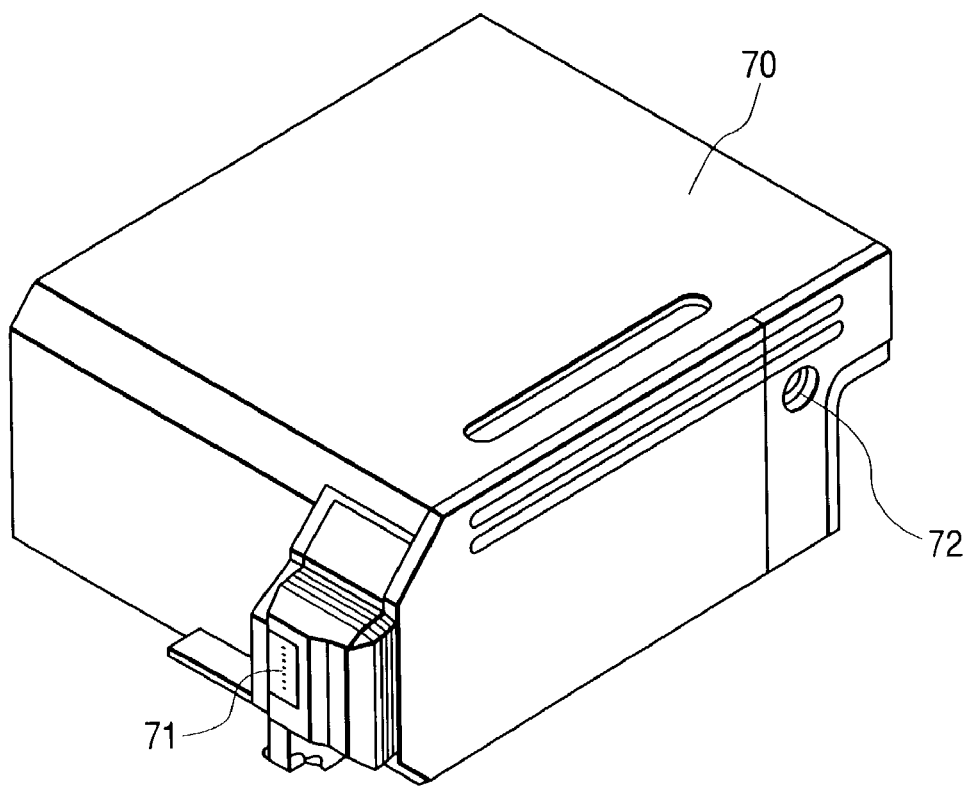
FIG. 6 is a perspective view of an example of a recording unit.

The ink-jet recording apparatus according to the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container containing an ink, for example, an ink-holding member, is contained. The recording unit 70 is so constructed that the ink in such an ink-holding member is ejected in the form of ink droplets through a head portion 71 having a plurality of orifices.

While polymers of inorganic compounds, polyvinyl acetate, polyolefins or the like are commonly used as a material for the ink-holding member, but as mentioned above, in the present invention, the ink-holding member is made of those compounds selected from the group including polyvinyl acetate and polyolefins. Further, while an ink-holding member made of a porous material or having a multi-layer structure is preferably used, it is particularly preferred to use compressed fiber aggregate from the viewpoints of the ink holding properties, ink ejecting properties, and reliability. It is preferred to use an ink-holding member having a multi-layer structure or fiber aggregate of which multi-layer arrangement or the fiber arrangement in the ink container is aligned in an ink discharging direction. It is also preferred an ink-holding member having a contact surface with the ink container. Reference numeral 72 indicates an air passage for communicating the interior of the recording unit 70 with the atmosphere. This recording unit 70 is used in place of the recording head 65 shown in FIG. 4, and is detachably installed on the carriage 66.

Figure 7:
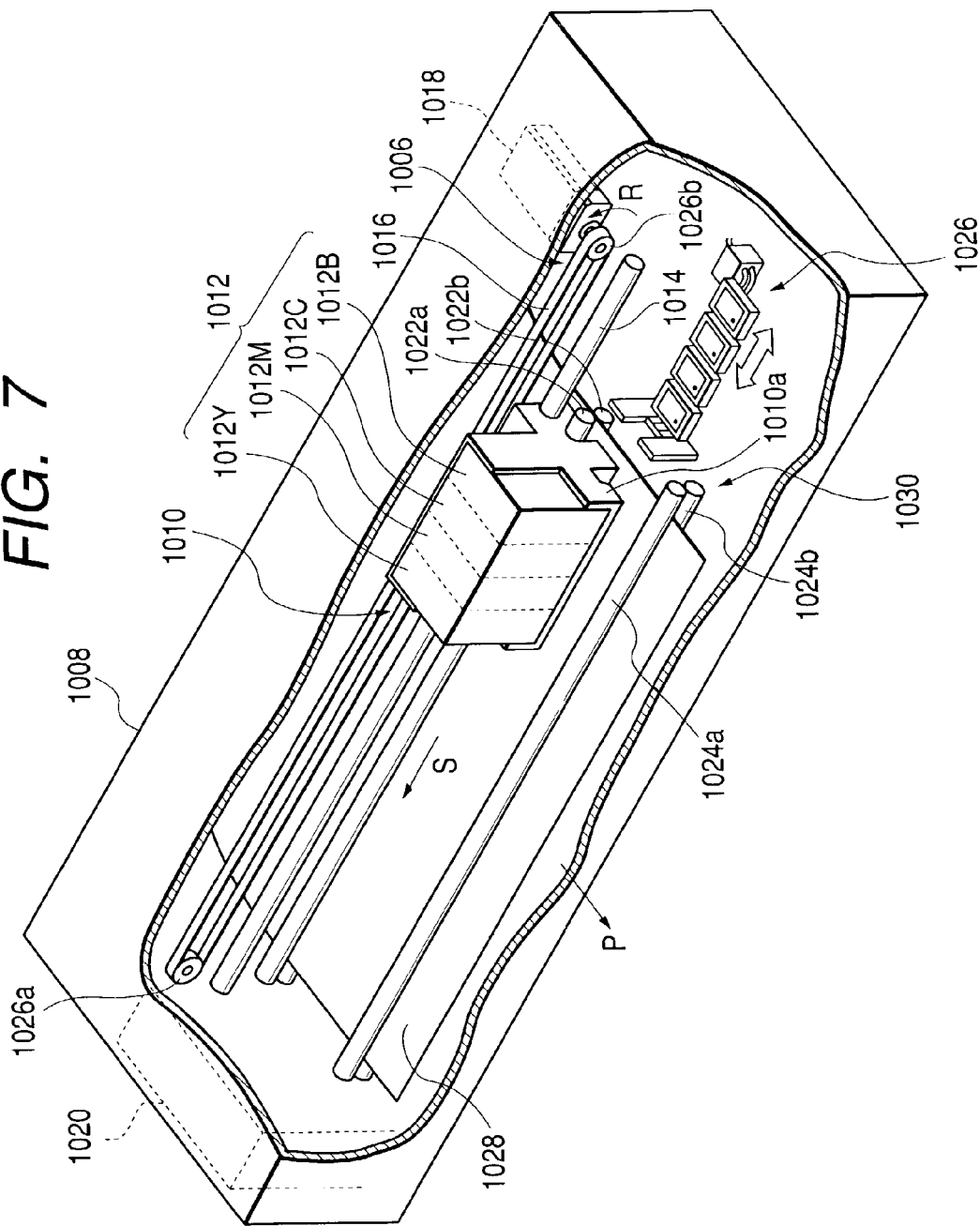
FIG. 7 is a schematic perspective view of the essential portion of an example of an ink jet printer capable of loading a liquid discharging head.

Other specific examples of the recording apparatus and recording heads preferably used in the present invention will hereinafter be described. FIG. 7 is a schematic perspective view illustrating principal parts of a liquid-ejecting head of an ejection system that a bubble communicates with the atmosphere upon ejection, and an exemplary ink-jet printer as a liquid-ejecting apparatus using this head.

In FIG. 7, the ink-jet printer comprises a conveying device 1030 for intermittently conveying paper 1028 as a recording medium provided along the longitudinal direction in a casing 1008 in a direction shown by an arrow P, a recording part 1010 reciprocatingly moved in a direction substantially parallel to a guide shaft 1014 in a direction of an arrow S substantially perpendicular to the conveying direction P of the paper 1028 by the conveying device 1030, and a driving part 1006 for movement as a driving means for reciprocatingly moving the recording part 1010.

The conveying device 1030 comprises a pair of roller units 1022a and 1022b and a pair of roller units 1024a and 1024b arranged in substantially parallel with and in opposed relation to each other, and a driving part 1020 for driving these respective roller units. By this construction, the paper 1028 is intermittently conveyed in a state that it is held between the respective roller units 1022a and 1022b and the roller units 1024a and 1024b in a direction shown by the arrow P in FIG. 7 when the driving part 1020 of the conveying device 1030 is operated.

The driving part 1006 for movement comprises a belt 1016 wound around pulleys 1026a and 1026b respectively provided on rotating shafts oppositely arranged at a prescribed interval and a motor 1018 for driving the belt 1016 joined to a carriage member 1010a of the recording part 1010 and arranged in substantially parallel to the roller units 1022a and 1022b in forward and reverse directions.

When the motor 1018 is operated to rotate the belt 1016 in a direction shown by an arrow R in FIG. 7, the carriage member 1010a of the recording part 1010 is moved by the prescribed movement in the direction shown by the arrow S in FIG. 7. When the motor 1018 is operated to rotate the belt 1016 in a direction reverse to the direction shown by the arrow R in FIG. 7, the carriage member 1010a of the recording part 1010 is moved by the prescribed amount of movement in a direction reverse to the direction shown by the arrow S in FIG. 7. At an end of the driving part 1006 for movement, a recovery unit 1026 for conducting an ejection-recovery operation for the recording part 1010 is provided in opposed relation to an array of ink-ejection openings of the recording part 1010 at the home position of the carriage member 1010a.

Figure 24:
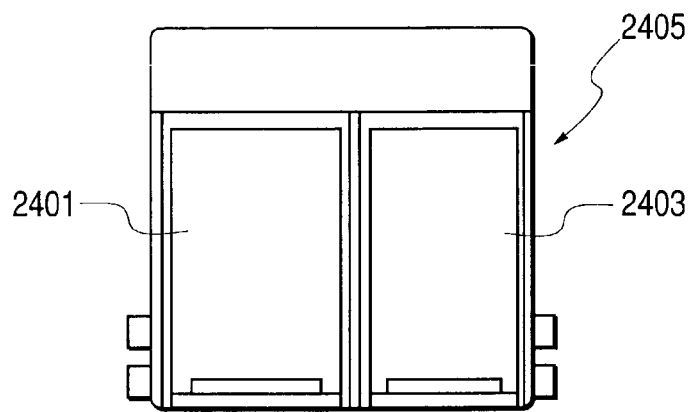
FIG. 24 is a schematic view indicating an embodiment of an ink cartridge relating to the present invention.
Figure 25:
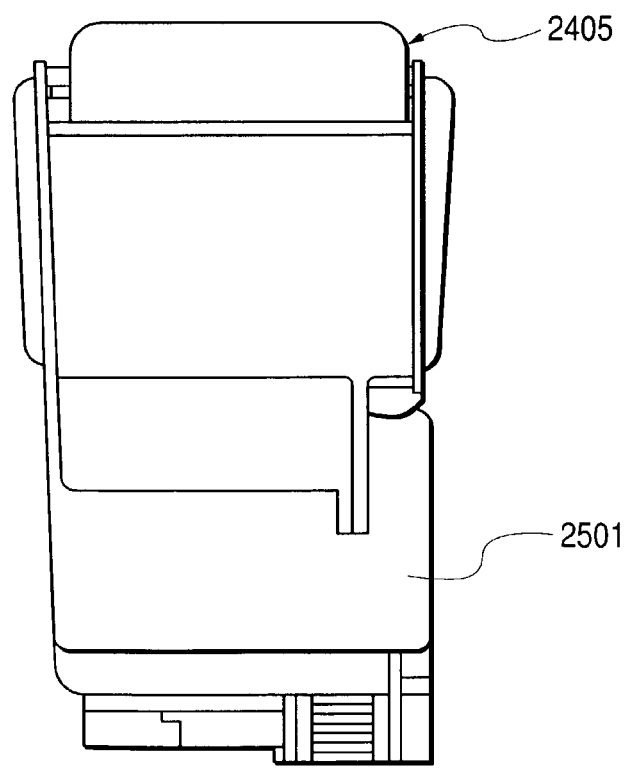
FIG. 25 is a schematic view showing an embodiment of a recording unit relating to the present invention.

In the recording part 1010, ink-jet cartridges (hereinafter may be referred merely to as "cartridges" in some cases) 1012Y, 1012M, 1012C and 1012B for respective colors, for example, yellow, magenta, cyan and black, are detachably mounted on a carriage member 1010a. In this case, the first and the second inks constituting an ink set relating to the present invention are each contained in independent cartridges. Other examples include, for example, an ink cartridge 2405 which, for example, is provided with ink containing parts 2401 and 2403 separately containing each of the first and the second inks as indicated in FIG. 24 and which is detachably disposed to an ink jet recording head 2501 as shown in FIG. 25. An ink cartridge concerning FIG. 24 is installed on the ink jet recording head 2501 as indicated in FIG. 25 to thereby supply the first ink and second ink to the recording head and then each ink is discharged. Furthermore, in FIGS. 24 and 25, while a configuration wherein an ink cartridge and an ink jet recording head are detachably provided was discussed, a construction of integrating an ink cartridge and an ink jet recording head can be included as an another example.

Figure 8:
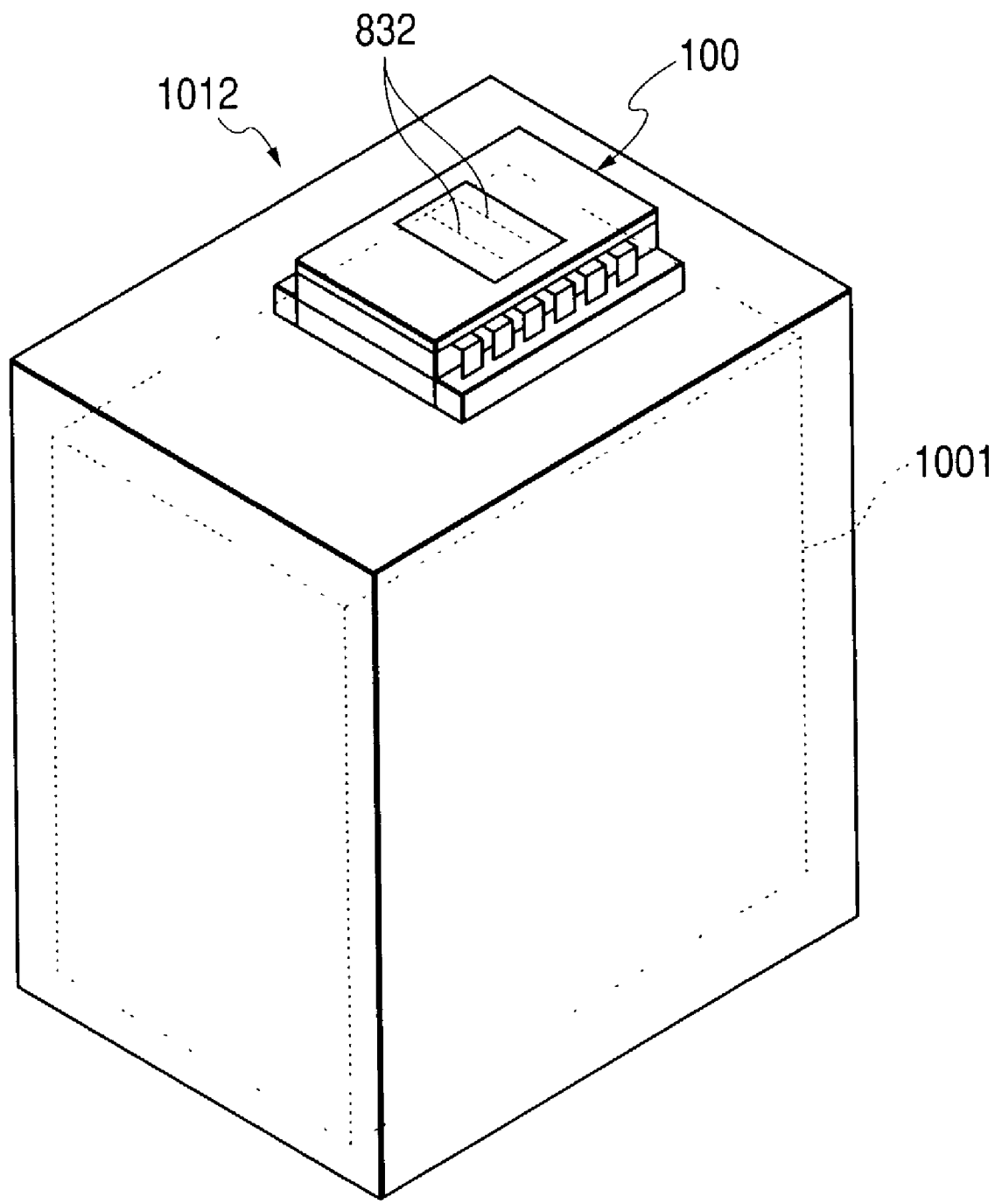
FIG. 8 is a schematic perspective view of an example of an ink jet cartridge provided with a liquid discharging head.

FIG. 8 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 for containing a liquid such as an ink.

In the ink-jet recording head 100, a large number of ejection openings 832 for ejecting the liquid are formed, and the liquid such as an ink is directed to a common liquid chamber (see FIG. 9) in the liquid-ejecting head 100 through a liquid feed passage (not illustrated) from the liquid tank 1001. The cartridge 1012 shown in FIG. 8 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

A specific example of the above-described liquid-ejecting head capable of being mounted on the ink-jet printer of such a construction will hereinafter be described in detail.

Figure 9:
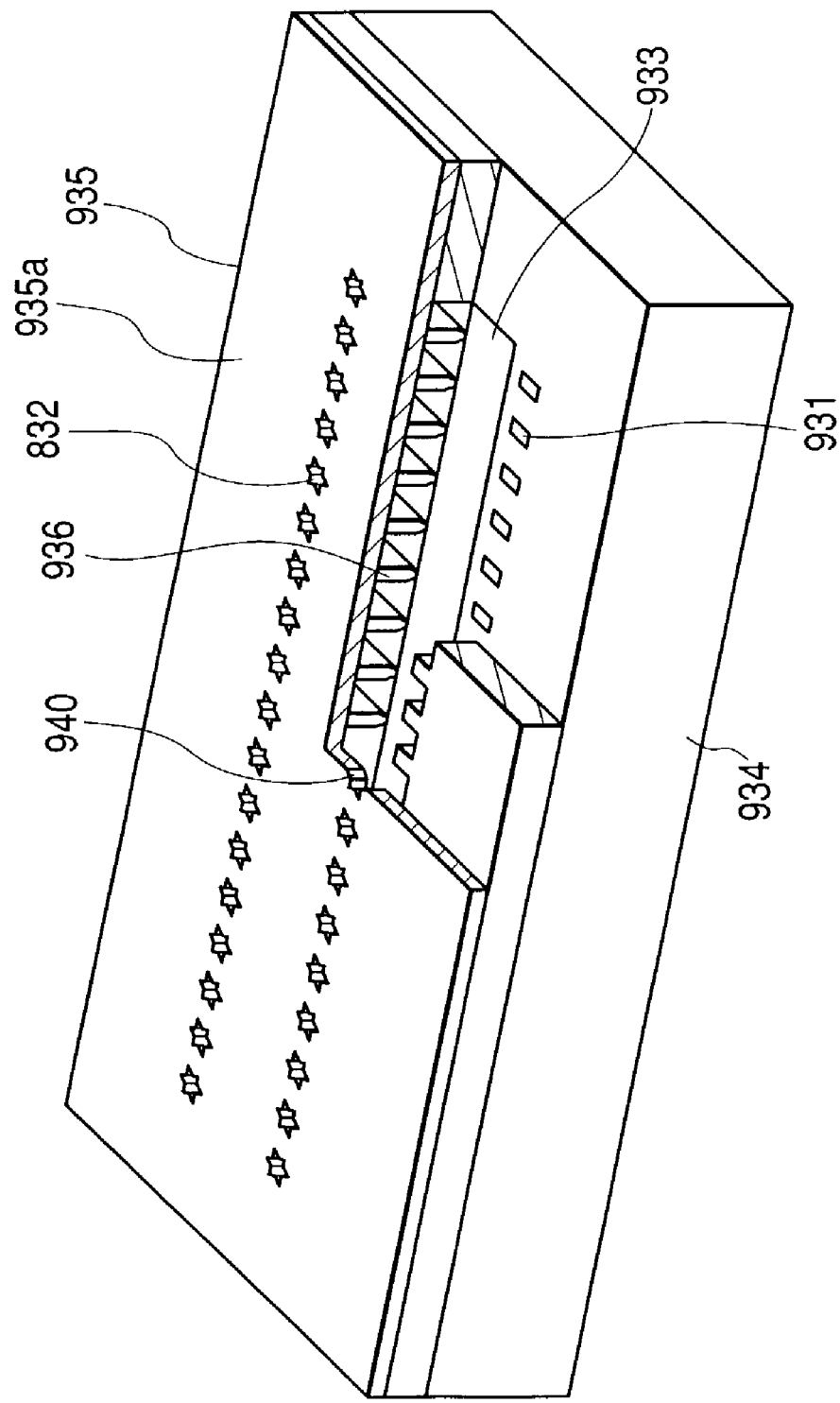
FIG. 9 is a schematic perspective view of the essential portion of an example of a liquid discharging head used for the ink jet cartridge shown in FIG. 8.

FIG. 9 is a schematic perspective view typically illustrating principal parts of a liquid-ejecting head suitable for use in the ink-jet recording apparatus of the present invention, and FIGS. 10 to 13 are front views illustrating the form of ejection openings of the liquid-ejecting head shown in FIG. 9. Incidentally, in these drawings, electrical wiring and the like for driving electrothermal conversion elements are omitted.

In the liquid-ejecting head according to this embodiment, such a substrate 934 composed of glass, ceramic, plastic or metal as illustrated in, for example, FIG. 9 is used. The material of such a substrate is not essential to the present invention and is not particularly limited so far as it functions as a part of a flow-path forming member and as a support for an ink ejection-energy-generating element, and a material layer for forming a liquid flow path and ejection openings, which will be described subsequently. Therefore, in this embodiment, the description is given in the case where an Si substrate (wafer) is used. The ejection openings can be formed on such a substrate 934. Processes therefor include a forming process by laser beam, and a process in which for example, a photosensitive resin is used as an orifice plate (ejection-opening plate) 935, which will be described subsequently, to form ejection openings by an exposure apparatus such as MPA (mirror projection aligner).

In FIG. 9, reference numeral 934 indicates a substrate equipped with electrothermal conversion elements (hereinafter may be referred to as "heater" in some cases) 931 and an ink feed opening 933 formed of a long-grooved through-opening as a common liquid chamber. The heaters 931, which are thermal energy-generating means, are arranged in a zigzag form in a row on both sides of the ink feed opening 933 along the longitudinal direction thereof with an interval of, for example, 300 dpi between the electrothermal conversion elements. Walls 936 for ink flow path for forming ink flow paths are provided on the substrate 934. Further, an ejection-opening plate 935 equipped with ejection openings 832 is provided on the walls 936 for ink flow path.

In FIG. 9, the walls 936 for ink flow path and the ejection-opening plate 935 are illustrated as separate members. However, the walls 936 for ink flow path may be formed on the substrate 934 by a method such as spin coating, thereby forming the walls 936 for ink flow path and the ejection-opening plate 935 as the same member at the same time. In this embodiment, the side of the ejection-opening face (upper surface) 935a is subjected to a water-repellent treatment.

In the apparatus illustrated, a head of the serial type that recording is conducted with scanning in the direction shown by the arrow S in FIG. 7 is used to conduct recording at, for example, 1,200 dpi. Driving frequency is 10 kHz, and ejection is conducted at the shortest time interval of 100 μs in one ejection opening.

Figure 10:
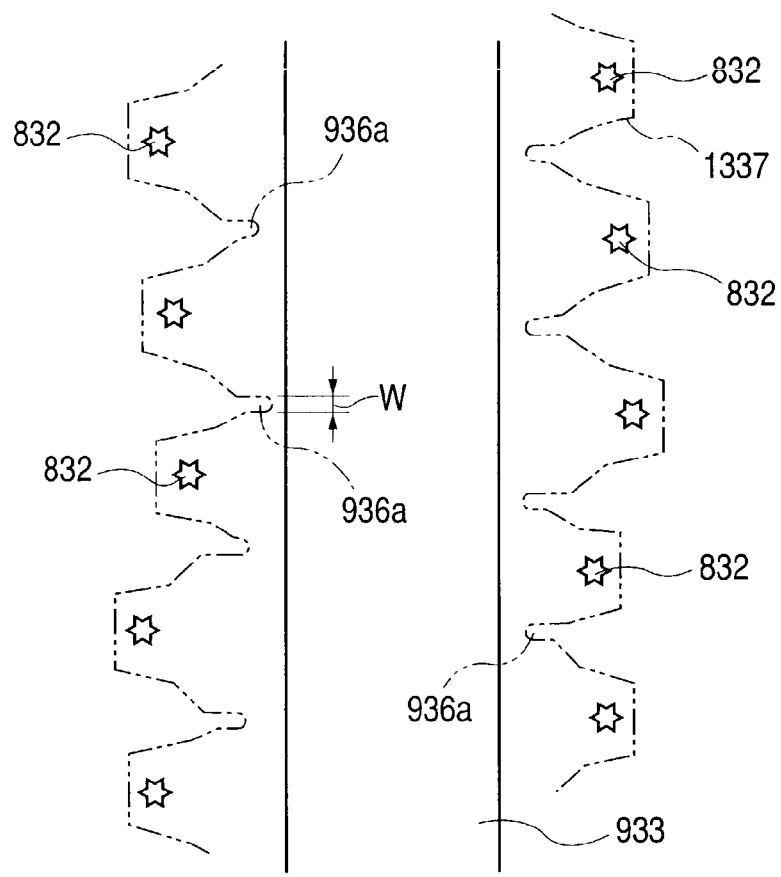
FIG. 10 is a schematic view of a portion extracted from an example of the liquid discharging head illustrated in FIG. 8.
Figure 13:
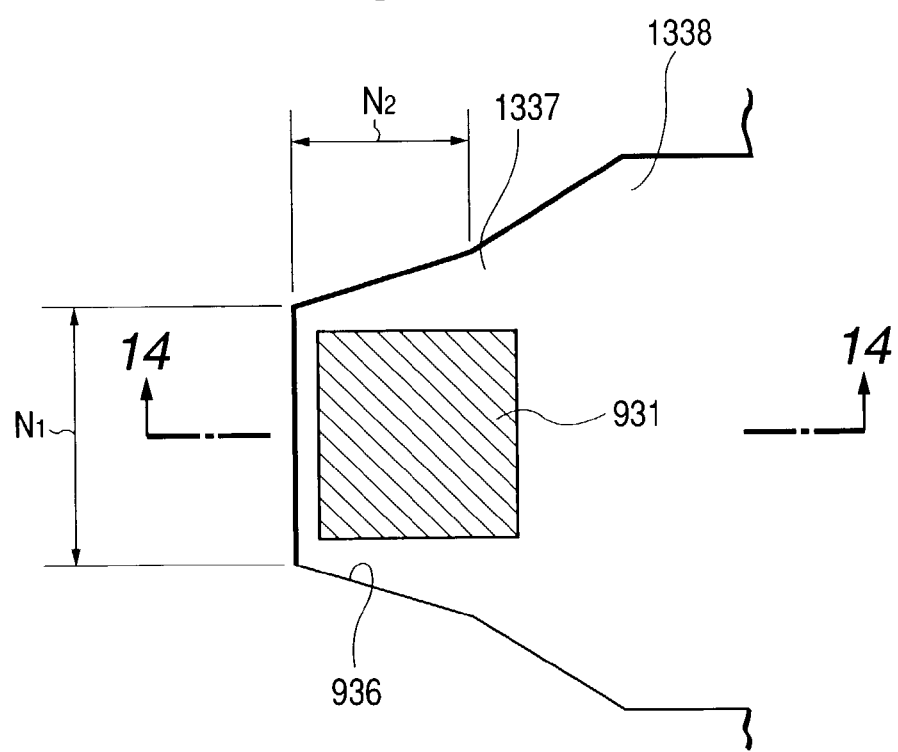
FIG. 13 is a schematic view of the main portion in FIG. 10.

As an example of dimensions of the head, a partition wall 936a for isolating adjacent nozzles from each other from the viewpoint of fluid has a width w of 14 μm as illustrated in, for example, FIG. 10. As illustrated in FIG. 13, a bubbling chamber 1337 formed with the walls 936 for ink flow path has N1 (width of the bubbling chamber) of 33 μm and N2 (length of the bubbling chamber) of 35 μm. The size of the heater 931 is 30 μm×30 μm, the resistance value of the heater is 53 Ω, and the driving voltage is 10.3 V. A head in which the heights of the wall 936 for ink flow path and the partition wall 936a are 12 μm, and the thickness of the ejection-opening plate is 11 μm may be used.

Figure 11:
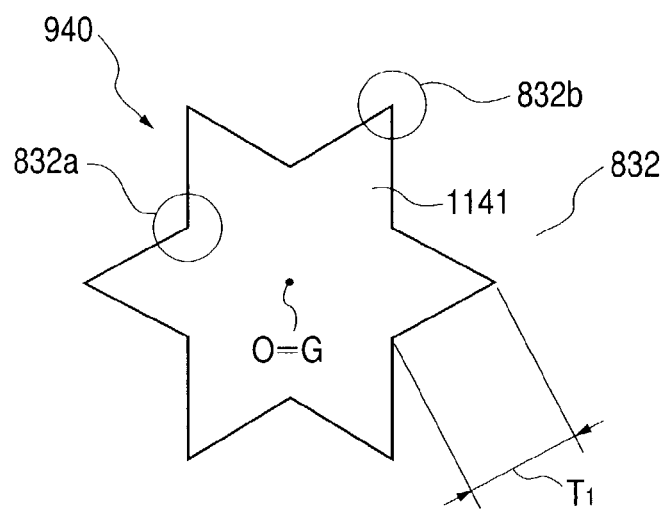
FIG. 11 is an enlarged view of the portion of the discharge port indicated in FIG. 10.

In the section of an ejection opening part 940 provided in the ejection-opening plate including ejection openings 832, the form of a section taken along a direction intersecting the ejecting direction (thickness-wise direction of the orifice plate 935) of the ink is a substantially star form as illustrated in FIG. 11 and is generally formed from 6 projected portions 832a having a corner of an obtuse angle and 6 recessed portions 832b alternately arranged between these projected portions 832a and having a corner of an acute angle. More specifically, 6 grooves (with respect to the position of the groove portion, see 1141a in FIG. 14) are formed in the thickness-wise direction (ejecting direction of the liquid) of the orifice plate shown in FIG. 9 by forming the recessed portions 832b locally distant from the center O of the ejection opening as a top thereof and the projected portions 832a adjacent to the recessed portions 832b and locally near from the center O of the ejection opening as a base.

Figure 17:
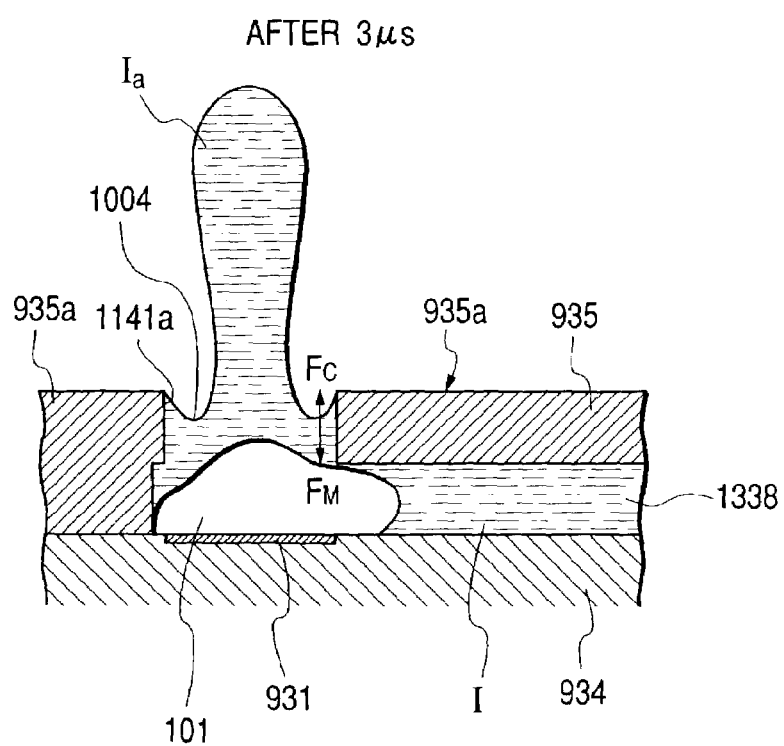
FIG. 17 corresponds to the 14—14 perspective sectional shape in FIG. 13 and is a schematic sectional view for describing the change in liquid discharging action of the liquid discharging head with time as in FIGS. 14, 15, 16, 18, 19, 20 and 21.

In the liquid-ejecting head illustrated, the ejection opening part 940 is such that, for example, a section taken along a direction intersecting the thickness-wise direction thereof is in a form with 2 equilateral triangles having a side of 27 μm combined with each other in a state that one of them has been turned by 60 degrees relative to the other. T1 shown in FIG. 17 is 8 μm. The angles of the projected portions 832a are all 120 degrees, while the angles of the recessed portions 832b are all 60 degrees.

Accordingly, the center O of the ejection opening coincides with the center of gravity G of the polygon formed by connecting the centers (the center (center of gravity) of each figure formed by connecting the top of the groove and the 2 bases adjacent to the top) of the grooves adjacent to each other (see FIG. 11). The opening area of the ejection opening 832 in this embodiment is 400 μm$^2$, and the opening area of each groove (the area of each figure formed by connecting the top of the groove and the 2 bases adjacent to the top) is about 33 μm$^2$.

Figure 12:
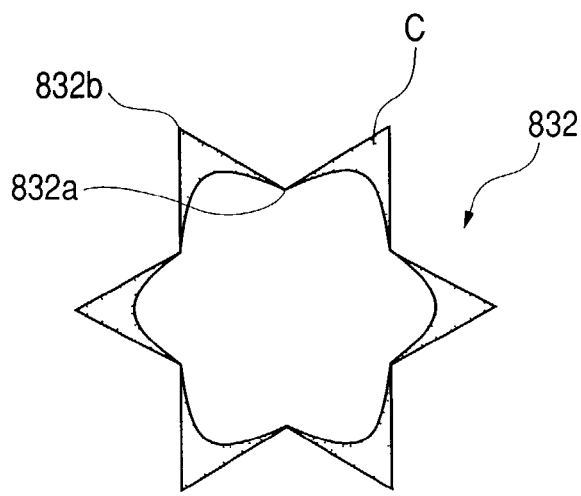
FIG. 12 is a schematic view indicating adhesion status of ink on the discharging mouth shown in FIG. 11.

FIG. 12 is a typical drawing illustrating a state that an ink has adhered to the ejection opening portion shown in FIG. 11.

An ejecting operation of a liquid by the ink-jet recording head of the above-described construction will hereinafter be described with reference to FIGS. 14 to 21.

FIGS. 14 to 21 are cross-sectional views for illustrating the ejecting operation of a liquid by the liquid-ejecting head shown in FIGS. 9 to 13 and are cross-sectional views of the bubbling chamber 1337 shown in FIG. 13 taken along line 14—14. In this section, an end of the ejection opening part 940 in the thickness-wise direction of the orifice plate is the top 1141a of a groove 1141.

Figure 14:
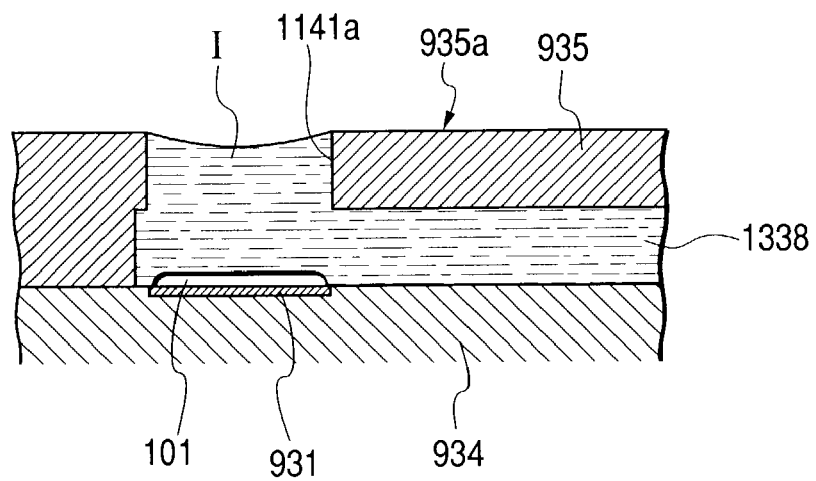
FIG. 14 corresponds to the 14—14 perspective sectional shape in FIG. 13 and is a schematic sectional view for describing the change in liquid discharging action of the liquid discharging head with time as in FIGS. 15, 16, 17, 18, 19, 20 and 21.

FIG. 14 illustrates a state that a film-like bubble has been formed on the heater, and FIGS. 15, 16, 17, 18, 19, 20 and 21 illustrate states after about 1 μs, about 2 μs, about 3 μs, about 4 μs, about 5 μs, about 6 μs and about 7 μs from the state in FIG. 14, respectively. Incidentally, in the following description, "drop" or "drop-in" does not mean drop in the so-called gravity direction, but means the movement in the direction of an electrothermal conversion element irrespective of the installing direction of a head.

Figure 15:
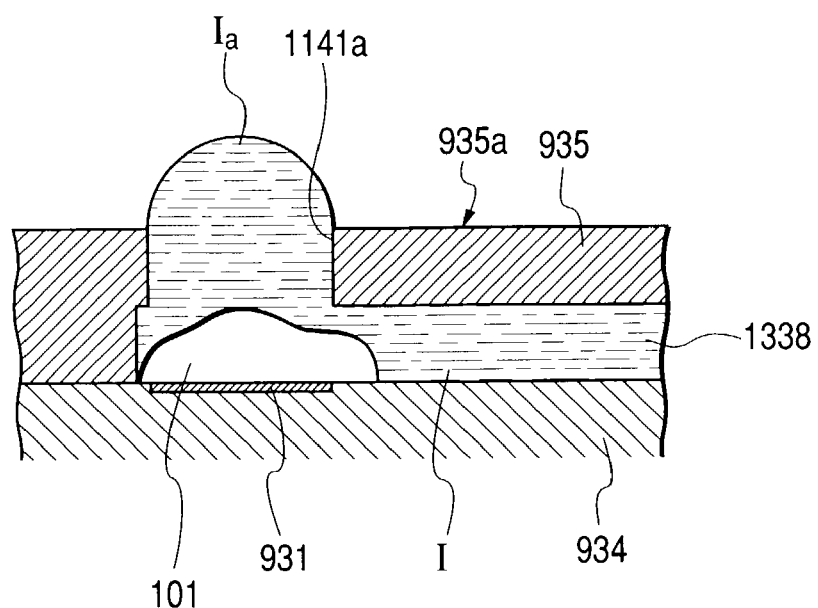
FIG. 15 corresponds to the 14—14 perspective sectional shape in FIG. 13 and is a schematic sectional view for describing the change in liquid discharging action of the liquid discharging head with time as in FIGS. 14, 16, 17, 18, 19, 20 and 21.
Figure 16:
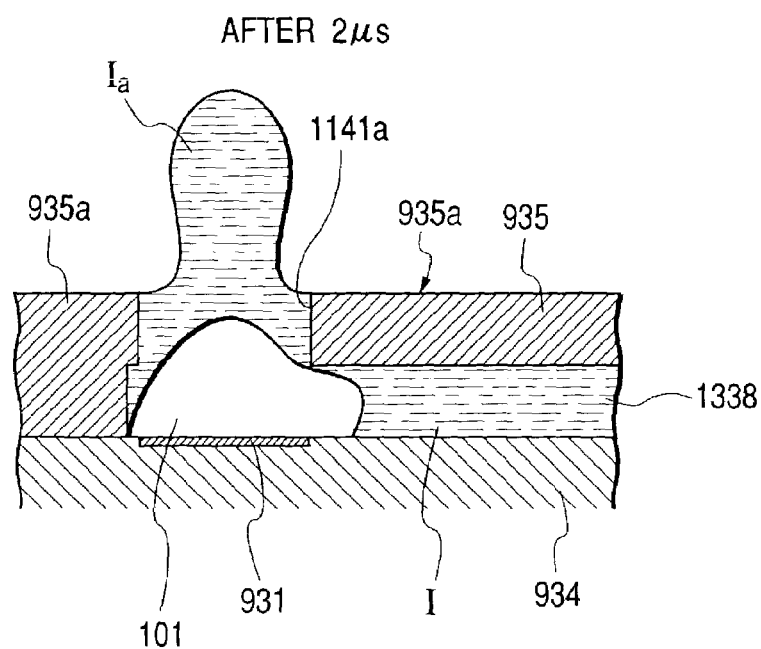
FIG. 16 corresponds to the 14—14 perspective sectional shape in FIG. 13 and is a schematic sectional view for describing the change in liquid discharging action of the liquid discharging head with time as in FIGS. 14, 15, 17, 18, 19, 20 and 21.

When a bubble 101 is first formed in a liquid flow path 1338 on a heater 931 by energizing the heater 931 on the basis of a recording signal or the like as illustrated in FIG. 14, the bubble quickly volumetrically expands and grows during about 2 μs as illustrated in FIGS. 15 and 16. The height of the bubble 101 in the greatest volume exceeds the face 935a of an ejection opening. At this time, the pressure of the bubble decreases from one to several to one to several tens as high as the atmospheric pressure.

At the time about 2 μs have elapsed from the formation of the bubble, the volume of the bubble 101 turns from the greatest volume to decreased volume as described above, and at substantially the same time as this, the formation of a meniscus 1004 is started. The meniscus 1004 also recedes, i.e., drops in the direction of the heater 931 as illustrated in FIG. 17.

In this embodiment, the ejection opening part in the liquid-ejecting head illustrated has a plurality of grooves 1141 in a dispersed state, whereby capillary force acts in an opposite direction FC to the receding direction FM of the meniscus at the portion of the groove 1141 when the meniscus 1004 recedes. As a result, the forms of the meniscus and a main droplet (hereinafter may be referred to as "liquid" or "ink" in some cases) Ia when the meniscus recedes are compensated so as to give substantially symmetrical forms to the center of the ejection opening even if some variation is observed in the state of the bubble 101 by some cause.

Figure 18:
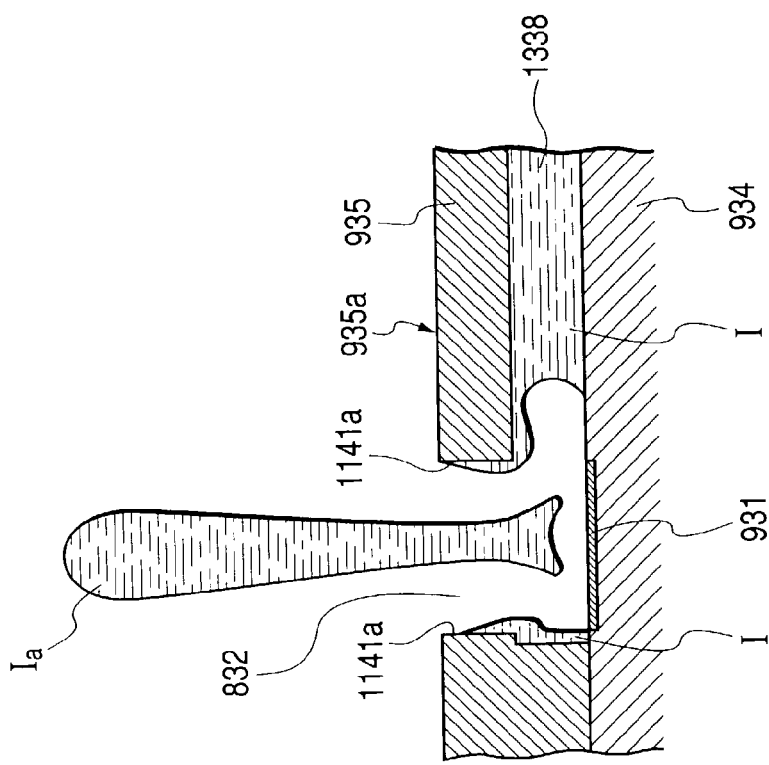
FIG. 18 corresponds to the 14—14 perspective sectional shape in FIG. 13 and is a schematic sectional view for describing the change in liquid discharging action of the liquid discharging head with time as in FIGS. 14, 15, 16, 17, 19, 20 and 21.

In the liquid-ejecting head illustrated, the dropping velocity of this meniscus 1004 is faster than the contracting velocity of the bubble 101, so that the bubble 101 communicates with the atmosphere in the vicinity of the lower surface of the ejection opening 832 at the time about 4 μs have elapsed from the formation of the bubble as illustrated in FIG. 18. At this time, the liquid (ink) in the vicinity of the central axis of the ejection opening 832 drops toward the heater 931 because the liquid (ink) Ia pulled back on the side of the heater 931 by the negative pressure of the bubble 101 before the communication with the atmosphere retains the velocity in the direction toward the heater 931 by virtue of inertia even after the communication with the atmosphere.

Figure 19:
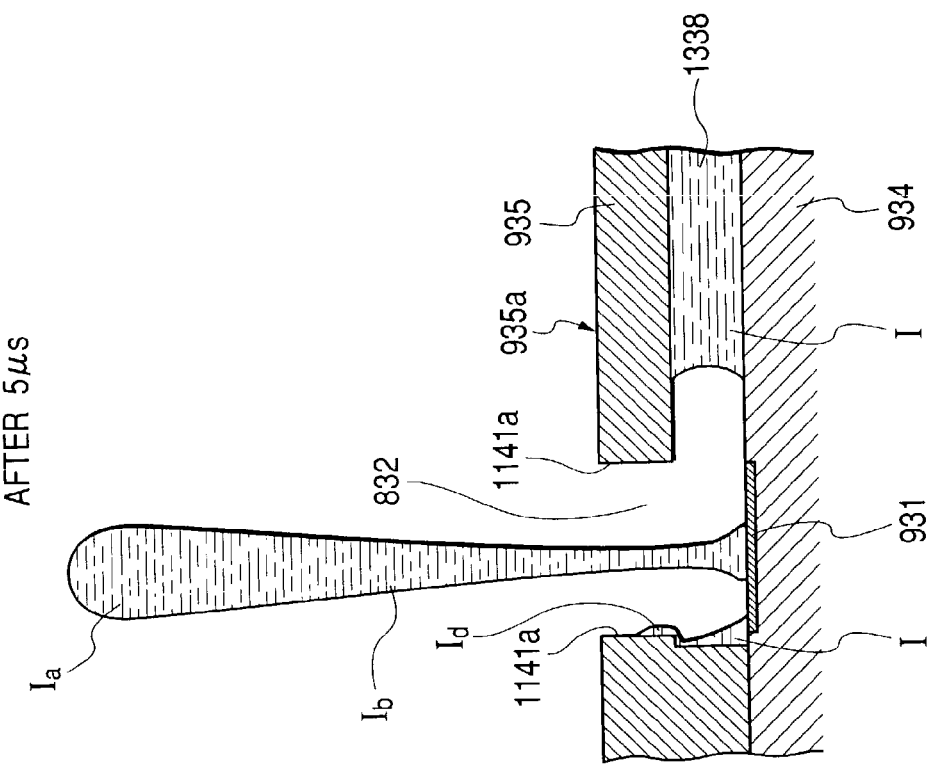
FIG. 19 corresponds to the 14—14 perspective sectional shape in FIG. 13 and is a schematic sectional view for describing the change in liquid discharging action of the liquid discharging head with time as in FIGS. 14, 15, 16, 17, 18, 20 and 21.

The liquid (ink) dropped toward the side of the heater 931 reaches the surface of the heater 931 at the time about 5 μs have elapsed from the formation of the bubble 101 as illustrated in FIG. 19, and spreads so as to cover the surface of the heater 931 as illustrated in FIG. 20. The liquid spread so as to cover the surface of the heater 931 as described above has a vector in a horizontal direction along the surface of the heater 931. However, a vector in a direction intersecting the surface of the heater 931, for example, perpendicular direction vanishes, so that the liquid intends to remain on the surface of the heater 931, thereby pulling a liquid located above such a liquid, i.e., a liquid keeping a velocity vector in the ejecting direction, downward.

Thereafter a liquid portion Ib between the liquid spread on the surface of the heater 931 and the liquid located thereabove (main droplet) becomes thin, and is broken in the center of the surface of the heater 931 at the time about 7 μs have elapsed from the formation of the bubble as illustrated in FIG. 21, whereby the liquid is separated into a main droplet Ia keeping a velocity vector in the ejecting direction and a liquid Ic spread on the surface of the heater 931. The position of such separation is desirably the interior of the liquid flow path 1338, preferably a side closer to the electrothermal conversion element 931 than the ejection opening 832.

The main droplet Ia is ejected from the central portion of the ejection opening 832 without deviation in the ejecting direction and ejection slippage and impacted at the prescribed position of a recording surface on a recording medium. The liquid Ic spread on the surface of the heater 931 is ejected as a satellite droplet following the main droplet up to now. However, it remains on the surface of the heater 931 without being ejected.

Since the ejection of the satellite droplet can be prevented as described above, splash easily occurring by the ejection of the satellite droplet can be prevented, and staining of the recording surface on the recording medium with mist suspending in the form of fog can be surely prevented. In FIGS. 18 to 21, reference characters Id and Ie indicate an ink attached to the groove portion (ink within the groove) and an ink remaining in the liquid flow path, respectively.

As described above, in the liquid-ejecting head illustrated, the direction of the main droplet upon ejection can be stabilized by the plural grooves dispersed relative to the center of the ejection opening when the liquid is ejected at the stage that the volume of the bubble decreases after growing into the greatest volume. As a result, a liquid-ejecting head free of slippage in the ejecting direction and high in impact accuracy can be provided. In addition, ejection can be stably conducted against the variation of bubbling at high driving frequency, whereby high-speed and high-definition printing can be realized.

In particular, in the liquid-ejecting head illustrated, the liquid is ejected by communicating the bubble with the atmosphere for the first time at the stage that the volume of the bubble decreases, whereby mist occurring upon the ejection of the droplet by communicating the bubble with the atmosphere can be prevented, so that the state that droplets adhere to the ejection opening face, which forms the main cause of the so-called sudden ejection failure can also be inhibited.

As another embodiment of the recording head of the ejection system that a bubble is communicated with the atmosphere upon ejection, there may be mentioned the so-called edge shooter type as described in, for example, Japanese Patent Registration No. 2783647.

In particular, the present invention has excellent effects in recording heads and recording apparatus of an ink-jet system that thermal energy is utilized to form a flying droplet to be ejected, thereby conducting recording, among the ink-jet recording systems.

With respect to the typical construction and principle thereof, those using the basic principle disclosed in, for example, U.S. Pat. Nos. 4,723,129 and 4,740,796 are preferred.

This system may be applied to any of the so-called On-Demand type and continuous type. In particular, the On-Demand type is effective because at least one driving signal which corresponds to recording information and gives a rapid temperature rise exceeding film boiling is applied to an electrothermal converter arranged corresponding to a sheet or liquid path, in which a liquid (ink) is held, thereby causing the electrothermal converter to generate thermal energy to cause film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124 that is an invention relating to the rate of temperature rise f the heat-acting surface are adopted, far excellent recording can be conducted.

As the construction of the recording head which makes up the ink-jet recording apparatus to be used in the present invention, such combined constructions (linear liquid flow path or perpendicular liquid flow path) of ejection openings, a liquid flow path and electrothermal converters as disclosed in the above-described U.S. specifications, and besides constructions based on U.S. Pat. Nos. 4,558,333 and 4,459,600 which disclose the construction that a heat-acting portion is arranged in a curved region may also be preferably used.

In addition, constructions based on Japanese Patent Application Laid-Open No. 59-123670 which discloses the construction that a slit common to a plurality of electrothermal converters are used as an ejection part of the electrothermal converters, and Japanese Patent Application Laid-Open No. 59-138461 which discloses the construction that an opening absorbing pressure wave of thermal energy is provided in opposition to an ejection part may also be effective for the present invention.

Further, as a full-line type recording head having a length corresponding to the longest width of recording media, on which a recording apparatus can record, both construction that the length is met by such a combination of plural recording heads as disclosed in the above-described specifications and construction as one recording head integrally formed may be used, and the above-described effects of the present invention can be more effectively exhibited.

In addition, the present invention is effective even when a replaceable, chip type recording head in which electrical connection to an apparatus body and the feed of an ink from the apparatus body become feasible by installing in the apparatus body, or a cartridge type recording head in which an ink tank is provided integrally in a recording head itself is used.

Further, the addition of recovery means for a recording head, preliminary auxiliary means, etc. which are provided to the constitution of the recording apparatus to be used for the present invention is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

As a recording mode of the recording apparatus, the present invention is extremely effective for not only recording mode using main colors such as black, but also apparatus equipped with at least one of complex color of different colors and full color by color mixing by integrally constructing a recording head or combining plural recording heads with each other.

In the above-described embodiments of the present invention, the inks have been described as liquid. However, inks solidified at room temperature or lower may also be used so far as they are softened or liquid at room temperature, or exhibit a liquid phase upon application of recording signals used because it is general in the above-described ink-jet systems that the temperature control of an ink itself is conducted within a range of from 30 to 70° C. to adjust the viscosity of the ink so as to fall within a stable ejection range.

In addition, inks that are liquefied by applying thermal energy according to recording signals and ejected as liquid inks, such as inks that temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those already beginning to solidify at the time they reach a recording medium, may also be applied to the present invention. In such a case, the inks may be in a form that they are opposed to electrothermal converters in a state retained as a liquid or solid in recesses or through-holes in a porous sheet as described in Japanese Patent Application Laid-Open No. 54-56847 or 60-71260. In the present invention, the above-described film boiling system is most effective for the above-described inks.

Furthermore, as forms of the recording apparatus according to the present invention, forms that the apparatus is integrally or separately provided as an image output terminal for information processing instruments such as word processors and computers, and forms such as copying machines combined with a reader and facsimiles having a transmitting-receiving function may also be adopted.

The outline of a liquid-ejecting apparatus in which the above-described liquid-ejecting head is installed will hereinafter be described.

Figure 22:
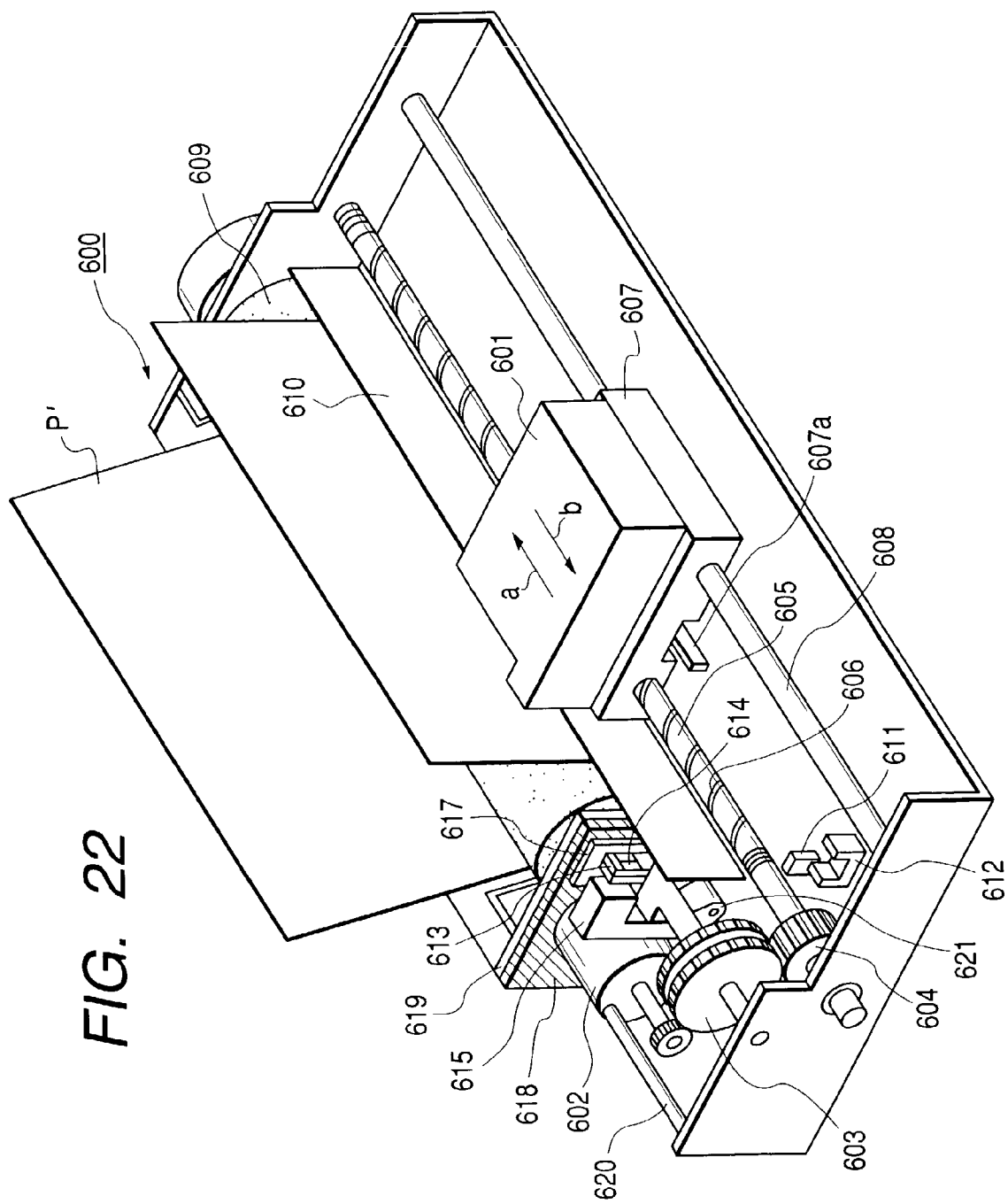
FIG. 22 is a schematic perspective view of an ink jet recording apparatus 600, an example of a liquid discharging apparatus that can be used in an ink jet recording method of the present invention.

FIG. 22 is a schematic perspective view of an ink-jet recording apparatus 600 which is an example of a liquid-ejecting apparatus to which the liquid-ejecting head described above can be installed and applied. In FIG. 22, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 of a lead-screw 605 rotating through driving force-transmitting gears 603 and 604 interlocking with the forward and reverse rotations of a driving motor 602 and reciprocatingly moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611 and 612 are arranged in the vicinity of an end of the leadscrew 605. These are home position-detecting means for confirming the presence of a lever 607a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck an ink stored in the interior of the cap member 614 by dummy ejection or the like from the ink-jet head cartridge 601. By this ink-sucking means 615, suction recovery of the ink-jet head cartridge 601 is conducted through an opening (not illustrated) in the cap. A cleaning blade 617 for wiping the ejection opening face of the ink-jet head cartridge 601 is provided movably in forward and backward directions (directions perpendicular to the moving directions of the carriage 607) by a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publicly known means such as clutch shift. An ink-jet recording control part for applying a signal to a heater provided in the liquid-ejecting head of the ink-jet head cartridge 601 and conducting drive control of the above-described respective mechanisms is provided on the side of the apparatus body and not illustrated here.

The ink-jet recording apparatus 600 having the above-described construction conducts recording on the recording medium P' conveyed on the platen roller 609 by the recording medium-conveying means (not illustrated) while reciprocatingly moving the ink-jet head cartridge 601 over the full width of the recording medium P'.

EXAMPLES

Now, the present invention will be described more specifically using Examples and Comparative Examples. Additionally, in Examples and Comparative Examples, part means part by weight and % refers to % by weight.

Inks were prepared as shown below.

<Cyan Ink 1>

(1) Preparation of Dispersion Solution

First, a block polymer of the AB type with an acid value of 300 and a number average molecular weight of 2000 was prepared by a conventional method using benzyl acrylate and methacrylic acid as raw materials and the polymer was neutralized with an aqueous potassium hydroxide solution and the resultant solution was diluted with ion exchange water to yield a homogeneous aqueous 50% polymer solution.

To 500 g of the above described polymer solution, 100 g of C.I. Pigment Blue 15:3 and 400 g of ion-exchanged water were added and premixed for 30 minutes. Then the mixture was subjected to a microfluidizer treatment by passing the mixture through an interaction chamber under a liquid pressure of about 10,000 psi (about 700 kg/cm$^2$) five times.

Further, the dispersion solution thus obtained was subjected to centrifugation (12,000 rpm, 20 minutes) to remove non-dispersed matter including coarse particles, thereby giving a cyan dispersion solution. The cyan dispersion solution thus obtained contained a pigment at a concentration of 5% and a dispersant at a concentration of 14%.

(2) Preparation of Cyan Ink 1

To the above cyan dispersion, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 0.5% and dispersant concentration was 1.4%.

| | |
|---|---|
| The above cyan dispersion solution | 10 parts |
| Glycerin | 12 parts |
| Diethylene glycol | 10 parts |
| Polyoxyethylene lauryl ether (EO 30) | 1 part |
| EO additive of acetylene glycol (trade name Acetylenol EH, product of Kawaken Fine Chemicals Co., Ltd.) | 0.5 parts |
| Ion exchange water | 66.5 parts |

<Magenta Ink 1>

(1) Preparation of Dispersion Solution

First, a block polymer of the AB type with an acid value of 250 and a number average molecular weight of 3000 was prepared by a conventional method using benzyl acrylate and methacrylic acid as raw materials and the polymer was neutralized with an aqueous potassium hydroxide solution and the resultant solution was diluted with ion exchange water to yield a homogeneous aqueous 50% polymer solution.

The above polymer solution (300 g), C.I. Pigment Red 122 (100 g) and ion exchange water (400 g) were mixed and then the mixture was mechanically stirred for 0.5 hour. Then, this solution was handled using a micro-fluidizer by passing through an interaction chamber 6 times under a liquid pressure of about 10,000 psi (about 700 kg/cm$^2$).

Further, the dispersion thus obtained was subjected to centrifugation (12,000 rpm, 20 minutes) to remove non-dispersed matter containing rough particles, thereby giving a magenta dispersion solution. The magenta dispersion solution thus obtained contained the pigment at a concentration of 6% and the dispersant at a concentration of 10%.

(2) Preparation of Ink (Magenta Ink 1)

To the above magenta dispersion, the following components were added as shown below, fully mixed and stirred. The mixture was filtrated under pressure through a micro-filter having a pore size of 2.5 μm (manufactured by Fuji Photo Film Co., Ltd.) to prepare an ink with a pigment concentration of 0.6% and a dispersant concentration of 1%.

| | |
|---|---|
| The above magenta dispersion | 10 parts |
| Glycerin | 8 parts |
| 1,2,6-Hexane triol | 5 parts |
| Trimethylol propane | 5 parts |
| Polyoxyethylene cetyl ether (EG 40) | 0.5 parts |
| EO additive of acetylene glycol (trade name Acetylenol EH, product of Kawaken Fine Chemicals Co., Ltd.) | 0.5 parts |
| Ion exchange water | 71 parts |

<Cyan Ink 2>

(1) Preparation of Dispersion Solution

First, a block polymer of the ABC type with an acid value of 350 and a number average molecular weight of 2500 was prepared by a conventional method using benzyl acrylate, methacrylic acid and ethoxyethylene glycol methacrylate as raw materials and the polymer was neutralized with an aqueous potassium hydroxide solution and the resultant solution was diluted with ion exchange water to yield a homogeneous aqueous 50% polymer solution.

The above polymer solution (550 g), C.I. Pigment Blue 15:4 (100 g) and ion exchange water (350 g) were mixed and then the resulting solution was mechanically stirred for 0.5 hour. Then, this solution was handled using a micro-fluidizer by passing through an interaction chamber 5 times under a liquid pressure of about 10,000 psi (about 700 kg/cm$^2$).

Further, the dispersion solution thus obtained was subjected to centrifugation (12,000 rpm, 20 minutes) to remove non-dispersed material containing rough particles, thereby giving a cyan dispersion solution. The cyan dispersion solution thus obtained contained the pigment at a concentration of 5% and the dispersant at a concentration of 15%.

(2) Preparation of Ink (Cyan Ink 2)

The following components were fully mixed by agitation and subjected to pressurized filtration through a microfilter of 2.5 μm pore size (product of Fuji Film). A pigment ink with a pigment concentration of 0.3% and a dispersant concentration of 3% was thus prepared

| The above cyan dispersion | 6 parts |
|---|---|
| The above 50% polymer solution | 4.2 parts |
| Glycerin | 10 parts |
| Triethylene glycol | 5 parts |
| Ethylene urea | 10 parts |
| Polyoxyethylene behenyl ether (EO 15)* | 0.5 part |
| EO additive of acetylene glycol (trade name Acetylenol EH, product of Kawaken Fine Chemicals Co., Ltd.) | 0.5 part |
| Ion exchange water | 63.8 parts |

*Polyoxyethylene behenyl ether $C_{22}H_{43}$—O—$(CH_2CH_2O)_{15}H$

<Magenta Ink 2>

(1) Preparation of Dispersion Solution

The 50% polymer solution (330 g) used in Cyan Ink 1, C.I. Pigment Red 122 (100 g) and ion exchange water (370 g) were mixed and then the resulting solution was mechanically stirred for 0.5 hour. Then, this solution was treated using a micro-fluidizer by passing through an interaction chamber 6 times under a liquid pressure of about 10,000 psi (about 700 kg/cm$^2$).

Further, the dispersion thus obtained was subjected to centrifugation (12,000 rpm, 20 minutes) to remove non-dispersed matter including coarse particles, thereby giving a magenta dispersion solution. The magenta dispersion solution thus obtained contained a pigment at a concentration of 6% and a dispersant at a concentration of 9%.

(2) Preparation of Ink

The following components were fully mixed by agitation and subsequently subjected to pressurized filtration by use of a microfilter of 2.5 μm pore size (product of Fuji Film). An ink with a pigment concentration of 0.9% and a dispersant concentration of 1.35% was thus prepared.

| The above magenta dispersion | 15 parts |
|---|---|
| Glycerin | 10 parts |
| Diethylene glycol | 10 parts |
| 2-Pyrrolidone | 5 parts |
| Polyoxyethylene stearyl ether (EO 20) | 0.5 parts |
| Surfynol 440 (product of Kawaken Fine Chemicals Co., Ltd.) | 0.1 part |
| Ion exchange water | 59.4 parts |

<Magenta Ink 3>

(1) Preparation of Dispersion Solution

The 50% polymer solution (260 g) used in Cyan Ink 1, C.I. Pigment Red 122 (100 g) and ion exchange water (440 g) were mixed and then the resulting solution was mechanically stirred for 0.5 hour. Then, this solution was treated using a micro-fluidizer by passing through an interaction chamber 6 times under a liquid pressure of about 10,000 psi (about 700 kg/cm$^2$).

Further, the dispersion thus obtained was subjected to centrifugation (12,000 rpm, 20 minutes) to remove non-dispersed matter including coarse particles, thereby giving a magenta dispersion solution. The magenta dispersion solution thus obtained contained a pigment at a concentration of 6% and a dispersant at a concentration of 7.2%.

(2) Preparation of Ink (Magenta Ink 3)

The following components were fully mixed by agitation and subsequently subjected to pressurized filtration by use of a microfilter of 2.5 μm pore size (product of Fuji Film). An ink with a pigment concentration of 0.9% and a dispersant concentration of 1.08% was thus prepared.

| The above magenta dispersion | 15 parts |
|---|---|
| Glycerin | 10 parts |
| Diethylene glycol | 10 parts |
| 2-Pyrrolidone | 5 parts |
| Polyoxyethylene stearyl ether (EO 20) | 0.5 parts |
| Surfynol 440 (product of Kawaken Fine Chemicals Co., Ltd.) | 0.1 part |
| Ion exchange water | 59.4 parts |

<Cyan Ink 3>

(1) Preparation of Dispersion Solution

The 50% polymer solution (90 g) used in Cyan Ink 1, C.I. Pigment Blue 15:3 (100 g) and ion exchange water (310 g) were mixed and then the resulting solution was mechanically stirred for 0.5 hour. Then, this solution was treated using a micro-fluidizer by passing through an interaction chamber 5 times under a liquid pressure of about 10,000 psi (about 700 kg/cm$^2$).

Further, the dispersion thus obtained was subjected to centrifugation (12,000 rpm, 20 minutes) to remove non-dispersed matter including coarse particles, thereby giving a cyan dispersion solution. The cyan dispersion solution thus obtained contained pigment at a concentration of 10% and the dispersant at a concentration of 5%.

(2) Preparation of Ink (Cyan Ink 3)

The following components were fully mixed by agitation and subsequently subjected to pressurized filtration by use of a microfilter of 2.5 μm pore size (product of Fuji Film). Cyan Ink 3 with a pigment concentration of 0.5% and a dispersant concentration of 0.25% was thus prepared.

| The above cyan dispersion | 5 parts |
|---|---|
| Glycerin | 10 parts |
| Diethylene glycol | 10 parts |
| Polyoxyethylene lauryl ether (EO 30) | 1 part |
| EO additive of acetylene glycol (trade name Acetylenol EH, product of Kawaken Fine Chemicals Co., Ltd.) | 0.5 parts |
| Ion exchange water | 73.5 parts |

<Dark Cyan Ink 1>

(1) Preparation of Dispersion Solution

The 50% polymer solution (120 g) used in Cyan Ink 1, C.I. Pigment Blue 15:3 (100 g) and ion exchange water (280 g) were mixed and then the resulting solution was mechanically stirred for 0.5 hour. Then, this solution was treated using a micro-fluidizer by passing through an interaction chamber 5 times under a liquid pressure of about 10,000 psi (about 700 kg/cm$^2$).

Further, the dispersion solution thus obtained was subjected to centrifugation (12,000 rpm, 20 minutes) to remove non-dispersed matter including coarse particles, thereby giving a cyan dispersion solution. The cyan dispersion solution thus obtained contained the pigment at a concentration of 10% and the dispersant at a concentration of 7%.

(2) Preparation of Ink (Dark Cyan Ink 1)

The following components were fully mixed by agitation and subsequently subjected to pressurized filtration by use of a microfilter of 2.5 μm pore size (product of Fuji Film). Dark cyan ink 1 with a pigment concentration of 3% and a dispersant concentration of 2.1% was thus prepared.

| | |
|---|---|
| The above cyan dispersion | 30 parts |
| Glycerin | 12 parts |
| Diethylene glycol | 10 parts |
| Polyoxyethylene lauryl ether (EO 30) | 1 part |
| EO additive of acetylene glycol (trade name Acetylenol EH, product of Kawaken Fine Chemicals Co., Ltd.) | 0.5 parts |
| Ion exchange water | 46.5 parts |

<Dark Magenta Ink 1>

(1) Preparation of Dispersion Solution

The 50% polymer solution (90 g) used in Magenta Ink 1, C.I. Pigment Red 122 (100 g) and ion exchange water (310 g) were mixed and then the resulting solution was mechanically stirred for 0.5 hour. Then, this solution was treated using a micro-fluidizer by passing through an interaction chamber 6 times under a liquid pressure of about 10,000 psi (about 700 kg/cm$^2$).

Further, the dispersion solution thus obtained was subjected to centrifugation (12,000 rpm, 20 minutes) to remove non-dispersed matter including coarse particles, thereby giving a magenta dispersion solution. The magenta dispersion solution thus obtained contained the pigment at a concentration of 10% and the dispersant at a concentration of 5%.

(2) Preparation of Ink (Dark Magenta Ink 1)

The following components were fully mixed by agitation and subsequently subjected to pressurized filtration by use of a microfilter of 2.5 μm pore size (product of Fuji Film). Dark magenta ink with a pigment concentration of 4% and a dispersant concentration of 2% was thus prepared.

| | |
|---|---|
| The above magenta dispersion | 40 parts |
| Glycerin | 12 parts |
| Diethylene glycol | 10 parts |
| Polyoxyethylene lauryl ether (EO 30) | 1 part |
| EO additive of acetylene glycol (trade name Acetylenol EH, product of Kawaken Fine Chemicals Co., Ltd.) | 0.5 parts |
| Ion exchange water | 36.5 parts |

The compositions and B/P ratios of the aforementioned Cyan Ink 1 (C1), Magenta Ink 1 (M1), Cyan Ink 2 (C2), Magenta Ink 2 (M2), Magenta Ink 3 (M3), Cyan Ink 3 (C3), Dark Cyan Ink 1 (DC1), and Dark Magenta Ink 1 (DM2) are summarized in Table 1.

TABLE 1

| | C1 | M1 | C2 | M2 | M3 | C3 | DC1 | DM1 |
|---|---|---|---|---|---|---|---|---|
| Block copolymer (benzylacrylate methacrylic acid) | 1.4 | 1 | 3 | 1.35 | 7.2 | 5 | 2.1 | 2 |

TABLE 1-continued

| | C1 | M1 | C2 | M2 | M3 | C3 | DC1 | DM1 |
|---|---|---|---|---|---|---|---|---|
| PBI15:3 | 0.5 | | | | | 10 | 3 | |
| PBI15:4 | | 0.3 | | | | | | |
| PR122 | | 0.6 | | 0.9 | 6 | | | 4 |
| Glycerin | 12 | 8 | 10 | 10 | 10 | 10 | 12 | 12 |
| Diethylene glycol | 10 | | | 10 | 10 | 10 | 10 | 10 |
| Poly-oxyethylene lauryl ether | | | | | | 1 | 1 | 1 |
| 1,2,6-Hexane triol | | 5 | | | | | | |
| Trimethylol-propane | | 5 | | | | | | |
| Poly-oxyethylene cetyl ether | | 0.5 | | | | | | |
| Triethylene glycol | | | 5 | | | | | |
| Ethylene urea | | | 10 | | | | | |
| Poly-oxyethylene behenyl ether | | | 0.5 | | | | | |
| 2-Pyrrolidone | | | | 5 | 5 | | | |
| Poly-oxyethylene stearyl ether | | | | 0.5 | 0.5 | | | |
| Surfynol 440 | | | | 0.1 | 0.1 | | | |
| Acetylenol EH | 0.5 | 0.5 | 0.5 | | | 0.5 | 0.5 | 0.5 |
| Water | 66.5 | 71 | 63.8 | 59.4 | 59.4 | 73.5 | 46.5 | 36.5 |
| B/P ratio | 2.8 | 1.7 | 10 | 1.5 | 1.2 | 0.5 | 0.7 | 0.5 |

Example 1

Cyan Ink 1 obtained as described above was applied to an ink jet color recording apparatus BJF-850 (product of Canon Inc.) having a plurality of on-demand type recording heads that discharge ink by thermal energy in response to recording signals to form an image, thereby light fastness and discharge tests were carried out.

Figure 23:
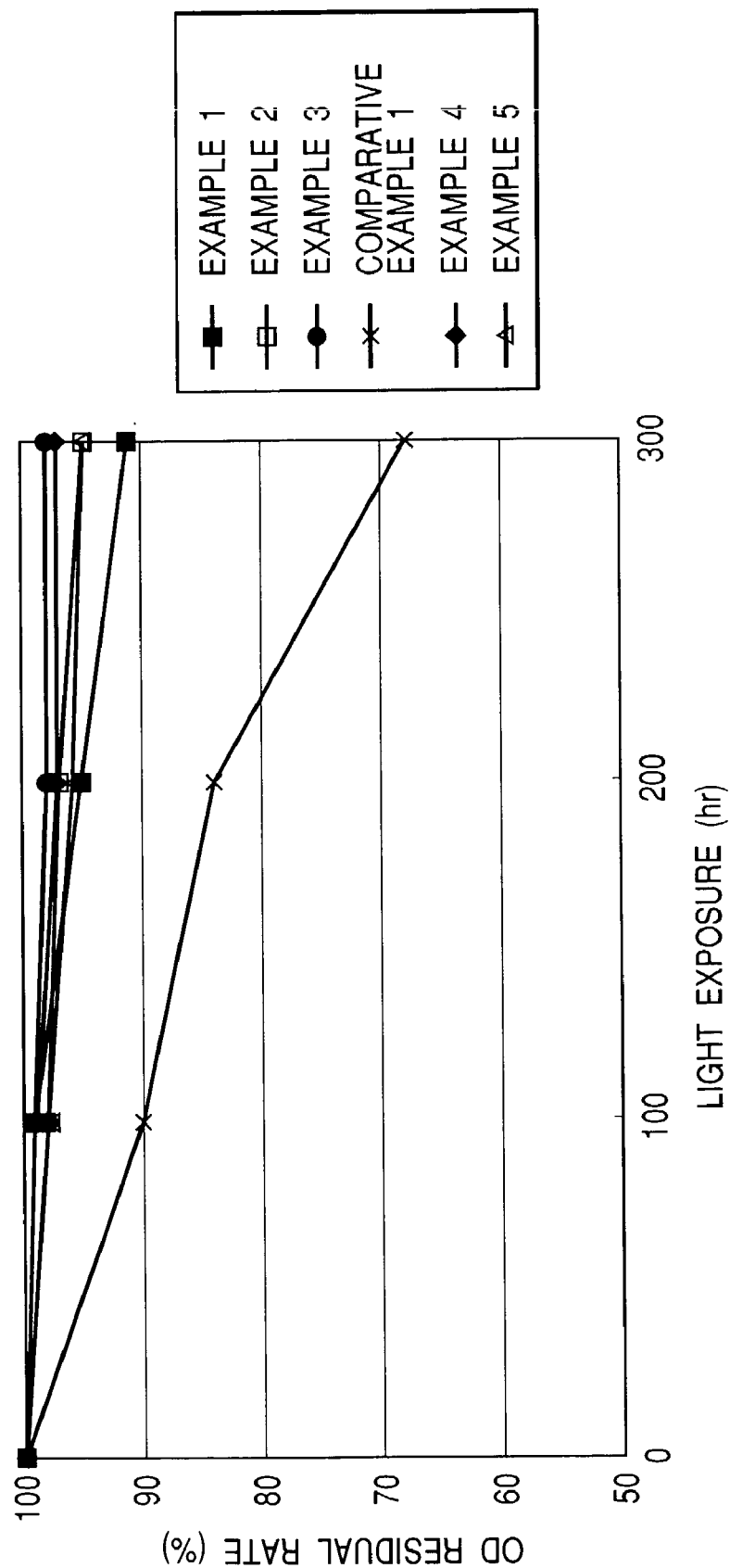
FIG. 23 is a graph indicating the light fastness of the inks in Examples 1 to 5 and Comparative Example 1.

First, a full solid image was printed on a recording medium HG-201 (product of Canon Inc.) using the ink of this Example. In this case, the amount of ink applied to the full solid print part was between 10 g/m$^2$ and 12 g/m$^2$. Then, an accelerated light fastness test was conducted on the printed article thus obtained using a Super Xenon SX-75 (product of Suga Test Instrument Co., Ltd.) with a xenon lamp up to 300 hours. Every 100 hours, OD values of the printed articles were measured by using an X-Rite (product of X-Rite Corp.) during the light fastness test. Then, the change of OD values during the light fastness test from the initial OD value was calculated from these measurements to obtain residual OD ratios (OD value after light exposure/initial OD value×100 (%)) as a parameter of color fading by light. The results are illustrated in FIG. 23. The smaller the numerical value of this OD residual ratio is, the larger the deterioration in density of the printed article.

In addition, the ink was continuously discharged from 10 nozzles for 2×10$^8$ pulses using a BJF-850 (product of Canon Inc.) to observe occurrence of non-discharge and the presence or absence of debris on the heater surface. The results are shown in Table 2 below (Discharge Durability test 1).

In Table 2, the discharge durability was evaluated based on the following criteria:

A: No discharge problem with 10 nozzles (all nozzles) and no debris on the heater surface observed;

B: No discharge problem with 10 nozzles (all nozzles), but some debris on the heater surface observed;

C: Nozzles with no discharge problem were 7 to 9 nozzles; and

D: Nozzles with no discharge problem were 6 or less.

Furthermore, the ink was continuously discharged for $4 \times 10^8$ pulses in the same manner as in the above discharge durability test 1 to evaluate the discharge durability. The result is given in Table 2 (Discharge Durability 2).

Example 2

Magenta Ink 1 prepared as described above was evaluated for light fastness and discharge durability in the same manner as in Example 1. The results are shown in FIG. 23 and Table 2.

Example 3

Cyan Ink 2 prepared as described above was evaluated for light fastness and discharge durability in the same manner as in Example 1. The results are shown in FIG. 23 and Table 2.

Example 4

Magenta Ink 2 prepared as described above was evaluated for light fastness and discharge durability in the same manner as in Example 1. The results are shown in FIG. 23 and Table 2.

Example 5

Magenta Ink 3 prepared as described above was evaluated for light fastness and discharge durability as in Example 1. The results are shown in FIG. 23 and Table 2.

Comparative Example 1

Cyan Ink 3 obtained as described above was evaluated for light fastness and discharge durability as in Example 1. The results are shown in FIG. 23 and Table 2.

As can be seen from FIG. 23, the inks in Examples 1 to 4 hardly suffered from light deterioration and thus showed good light fastness. On the other hand, the ink in Comparative Example 1 caused light deterioration.

Also, as can be seen from Table 2, the inks in Examples 1 to 4 are more excellent in discharge durability than the ink in Comparative Example 1.

TABLE 2

|  | Pigment concentration (%) | B/P ratio | Discharge durability 1 | Discharge durability 2 |
| --- | --- | --- | --- | --- |
| Example 1 | 0.5 | 2.8 | A | A |
| Example 2 | 0.6 | 1.7 | A | A |
| Example 3 | 0.3 | 10 | A | A |
| Example 4 | 0.9 | 1.5 | A | A |
| Example 5 | 0.9 | 1.2 | A | B |
| Comparative Example 1 | 0.5 | 0.5 | D | D |

Example 6

An ink set comprised of Cyan Ink 1 and Dark Cyan Ink 1 obtained as described above was applied to an ink jet color recording apparatus BJF-850 (product of Canon Inc.) to print a gradation image formed with a combination of these two inks. Then, accelerated light fastness test was carried out with the printed article obtained as above up to 300 hours by using a Super Xenon SX-75 (product of Suga Test Instrument Co., Ltd.).

The printed article made with the ink set of this Example was smooth at the border of gradation even after light fastness test not different from the initial condition.

Example 7

An ink set comprised of Magenta Ink 1 and Dark Magenta Ink 1 obtained as described above was evaluated in the same manner as in Example 6.

The printed article made with the ink set of this Example was smooth at the border of gradation even after light fastness test not different from the initial condition.

[Advantages of the Invention]

The light ink of the present invention provides excellent image fastness, particularly light fastness, and also has excellent discharge properties even used with a highly fine head using thermal energy for a long period of time. In addition, an ink set of light and dark ink of the present invention using this light ink keeps a color balance even after outdoor exposure for a long time and gives a high quality image.

What is claimed is:

1. An ink jet recording method comprising a step of discharging at least one of a first ink and a second ink constituting an ink set using thermal energy in response to a recording signal,
    wherein the first ink is an ink for thermal ink jet recording comprising an aqueous medium and a coloring material dispersed in the aqueous medium with a dispersant, the coloring material being contained in an amount of at most 1% by weight with respect to the total weight of said ink, wherein a ratio (B/P ratio) of the dispersant to the coloring material is larger than 1, wherein the dispersant is a resinous dispersant that comprises a block polymer, and
    wherein the second ink is for thermal ink jet recording, forms an image having the same or substantially the same hue on a recording medium as that formed with the first ink, and has higher coloring ability than that of the first ink.

2. The ink jet recording method according to claim 1, wherein the block copolymer has a number average molecular weight of 2,000 to 10,000.

3. An ink jet recording apparatus comprising an ink container containing an ink and a thermal ink jet head for discharging the ink,
    wherein the ink is an ink for thermal ink jet recording comprising an aqueous medium and a coloring material dispersed in the aqueous medium with a dispersant, the coloring material being contained in an amount of at most 1% by weight with respect to the total weight of the ink,
    wherein a ratio (B/P ratio) of the dispersant to the coloring material is larger than 1, and
    wherein the dispersant is a resinous dispersant that comprises a block polymer.

4. The ink jet recording apparatus according to claim 3, wherein the block copolymer has a number average molecular weight of 2,000 to 10,000.

5. An ink jet recording apparatus comprising ink containers containing a first ink and a second ink constituting an ink set respectively, and thermal ink jet heads for discharging the respective inks, wherein the first ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, wherein the dispersant is a resinous dispersant that comprises a block polymer, and wherein the second ink is for thermal ink jet recording, forms an image having the same or substantially the same hue on a recording medium as that formed with the first ink, and has higher coloring ability than that of the first ink.

6. The ink jet recording apparatus according to claim 5, wherein the block copolymer has a number average molecular weight of 2,000 to 10,000.

7. A recording unit comprising an ink container containing an ink and a thermal ink jet head for discharging the ink,
wherein the ink is an ink for thermal ink jet recording comprising an aqueous medium and a coloring material dispersed in the aqueous medium with a dispersant, the coloring material being contained in an amount of at most 1% by weight with respect to the total weight of the ink, wherein a ratio (B/P ratio) of the dispersant to the coloring material is larger than 1, and wherein the dispersant is a resinous dispersant that comprises a block polymer.

8. The recording unit according to claim 7, wherein the block copolymer has number average molecular weight of 2,000 to 10,000.

* * * * *

UNITED STATES PATENT AND TRADEMARK OFFICE
CERTIFICATE OF CORRECTION

PATENT NO. : 7,029,109 B2
APPLICATION NO. : 10/218423
DATED : April 18, 2006
INVENTOR(S) : Koromo Shirota et al.

It is certified that error appears in the above-identified patent and that said Letters Patent is hereby corrected as shown below:

COVER PAGE AT ITEM [56] RC:
Foreign Patent Documents, "EP 0992551 A2 * 4/2000" should be deleted.

COLUMN 1:
Line 35, "has" should read --there has--, and "provide" should read --provides--.
Line 36, "are" should read --is--.

COLUMN 4:
Lines 50-53 should be deleted.

COLUMN 11:
Line 35, "Ink" should read --¶ Ink--.

COLUMN 19:
Line 2, "far" should read --far more--.
Line 17, "are" should read --is--.

Signed and Sealed this

Sixth Day of March, 2007

JON W. DUDAS
*Director of the United States Patent and Trademark Office*